US011612844B2

(12) United States Patent
Sato et al.

(10) Patent No.: US 11,612,844 B2
(45) Date of Patent: Mar. 28, 2023

(54) PILLAR-SHAPED HONEYCOMB STRUCTURE FILTER

(71) Applicant: NGK INSULATORS, LTD., Nagoya (JP)

(72) Inventors: Yoshihiro Sato, Nissin (JP); Shuji Ueda, Nagoya (JP); Koichi Sendo, Nagoya (JP); Yutaka Ishii, Ama-Gun (JP); Yuichi Tajima, Nagoya (JP); Seiya Nakano, Nagoya (JP); Ken Itazu, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/652,310

(22) Filed: Feb. 24, 2022

(65) Prior Publication Data

US 2022/0314154 A1 Oct. 6, 2022

(30) Foreign Application Priority Data

Mar. 31, 2021 (JP) .............................. JP2021-061931
Jan. 26, 2022 (JP) .............................. JP2022-010347

(51) Int. Cl.
*B01D 46/24* (2006.01)
(52) U.S. Cl.
CPC ... *B01D 46/24491* (2021.08); *B01D 46/2429* (2013.01); *B01D 46/2474* (2013.01)
(58) Field of Classification Search
CPC .......... B01D 46/24491; B01D 46/2429; B01D 46/2474; Y02T 10/12
USPC ........................................................ 55/523
See application file for complete search history.

(56) References Cited

U.S. PATENT DOCUMENTS

| 2007/0234694 | A1* | 10/2007 | Miyairi | ............... | C04B 38/0009 55/523 |
| 2011/0212831 | A1 | 9/2011 | Goto et al. | | |
| 2011/0219736 | A1* | 9/2011 | Hiramatsu | ....... | B01D 46/24491 55/489 |
| 2011/0229634 | A1 | 9/2011 | Tsuji et al. | | |
| 2011/0239601 | A1* | 10/2011 | Tokuda | ................. | F01N 3/0222 55/486 |

(Continued)

FOREIGN PATENT DOCUMENTS

| EP | 2 554 234 A1 | 2/2013 |
| JP | 2011-147931 A | 8/2011 |

(Continued)

OTHER PUBLICATIONS

Japanese Office Action (Application No. 2021-061931) dated Jun. 29, 2021.

*Primary Examiner* — Tom P Duong
(74) *Attorney, Agent, or Firm* — Burr Patent Law, PLLC

(57) ABSTRACT

A pillar-shaped honeycomb structure including a plurality of first cells extending from an inlet side end surface to an outlet side end surface, and a plurality of second cells extending from the inlet side end surface to the outlet side end surface, with a porous partition wall interposed therebetween, wherein a porous film having a porosity higher than that of the partition walls is provided on a surface of each of the first cells, and at a cross-section orthogonal to the direction in which the first cells of the pillar-shaped honeycomb structure filter extend, the average thickness of the porous film in the central portion is larger than the average thickness of the porous film in the outer peripheral portion.

7 Claims, 7 Drawing Sheets

(56) References Cited

U.S. PATENT DOCUMENTS

| | | | |
|---|---|---|---|
| 2012/0009092 A1 | 1/2012 | Mizutani et al. | |
| 2012/0017555 A1 | 1/2012 | Iwasaki et al. | |
| 2012/0058019 A1 | 3/2012 | Mizutani et al. | |
| 2012/0240538 A1* | 9/2012 | Isoda | B01D 46/24492 55/486 |
| 2012/0240539 A1* | 9/2012 | Kikuchi | B01D 46/2484 55/486 |
| 2012/0240541 A1* | 9/2012 | Isoda | B01D 46/2484 427/180 |
| 2012/0262639 A1* | 10/2012 | Kim | G02B 30/25 349/96 |
| 2015/0059305 A1 | 3/2015 | Kasuga et al. | |
| 2015/0121824 A1 | 5/2015 | Jinbo et al. | |
| 2019/0001280 A1* | 1/2019 | Furukawa | B01D 71/024 |
| 2019/0390584 A1* | 12/2019 | Kasuga | F01N 3/0222 |

FOREIGN PATENT DOCUMENTS

| | | |
|---|---|---|
| JP | 5597148 B2 | 10/2014 |
| JP | 5863950 B2 | 2/2016 |
| JP | 5863951 B2 | 2/2016 |
| WO | 2010/110010 A1 | 9/2010 |
| WO | 2010/113585 A1 | 10/2010 |
| WO | 2011/125768 A1 | 10/2011 |
| WO | 2011/125769 A1 | 10/2011 |
| WO | 2013/145320 A1 | 10/2013 |

* cited by examiner

PILLAR-SHAPED HONEYCOMB STRUCTURE FILTER

CROSS REFERENCE TO RELATED APPLICATIONS

The present invention claims the benefit of priority to Japanese Patent Application No. 2021-061931 filed on Mar. 31, 2021 with the Japanese Patent Office and Japanese Patent Application No. 2022-010347 filed on Jan. 26, 2022 with the Japanese Patent Office, the entire contents of which are incorporated herein by reference in its entirety.

FIELD OF THE INVENTION

The present invention relates to a pillar-shaped honeycomb structure filter.

BACKGROUND OF THE INVENTION

Particulate matter such as soot (hereinafter referred to as PM) is contained in the exhaust gas discharged from the internal combustion engine such as a diesel engine and a gasoline engine. Soot is harmful to the human body and its emission is regulated. Currently, in order to comply with exhaust gas regulations, filters typified by DPF and GPF, which allow exhaust gas to pass through permeable partition walls with small pores and filter PM such as soot, are widely used.

As a filter for collecting PM, there is known a wall-flow type pillar-shaped honeycomb structure filter comprising a plurality of first cells extending in the height direction from an inlet side end surface to an outlet side end surface, each opening on the inlet side end surface and having plugged portions on the outlet side end surface, and a plurality of second cells arranged adjacent to the first cell with a partition wall interposed therebetween, extending in the height direction from the inlet side end surface to the outlet side end surface, each having plugged portions on the inlet side end surface and opening on the outlet side end surface.

In recent years, with the tightening of exhaust gas regulations, stricter PM emission standards (PN regulation: particle matter number regulation) have been introduced, and high PM collection performance (PN high collection efficiency) is required for filters. Therefore, it has been proposed to form a layer for collecting PM on the surface of the cells (Patent Literature 1 to 7). According to these patent literatures, it is possible to collect PM while reducing the pressure loss by forming the collection layer. As a method for forming a porous film, a method is adopted in which particles smaller than the average particle diameter of the particles constituting the partition walls are supplied to the inlet side end surface of the filter by a solid-air two-phase flow and attached to the surface of the first cells, and then heat treatment is performed.

CITATION LIST

Patent Literature

[Patent Literature 1] WO 2010/110010
[Patent Literature 2] WO 2011/125768
[Patent Literature 3] WO 2011/125769
[Patent Literature 4] Japanese Patent No. 5863951
[Patent Literature 5] Japanese Patent Application Publication No. 2011-147931
[Patent Literature 6] Japanese Patent No. 5863950
[Patent Literature 7] Japanese Patent No. 5597148

SUMMARY OF THE INVENTION

In order to improve the PM collection performance of the pillar-shaped honeycomb structure filter, it is considered effective to form collection layers on the surface of the cells, but there is still room for improvement in the collection layer. It would be advantageous if the PM collection performance could be improved when the flow velocity of the exhaust gas is large, for example, when an automobile is being accelerated. Therefore, in one embodiment, an object of the present invention is to provide a pillar-shaped honeycomb structure filter that can contribute to the improvement of PM collection performance when the flow velocity of exhaust gas is large.

As a result of diligent studies to solve the above problems, the present inventors have discovered that, as the flow velocity of the exhaust gas increases, the flow velocity of the exhaust gas when passing through the partition walls of the pillar-shaped honeycomb structure filter tends to be larger in the central portion than that in the outer peripheral portion. Further, the present inventors have found that increasing the thickness of the collection layer (equivalent to the "porous film" in the present invention) from the outer peripheral portion toward the central portion is advantageous in improving the PM collection performance when the flow velocity of the exhaust gas is large. The present invention has been completed based on the above findings, and is exemplified as below.

[1]

A pillar-shaped honeycomb structure filter comprising a plurality of first cells extending from an inlet side end surface to an outlet side end surface, each opening on the inlet side end surface and a having plugged portion on the outlet side end surface, and a plurality of second cells extending from the inlet side end surface to the outlet side end surface, each having a plugged portion on the inlet side end surface and opening on the outlet side end surface, the plurality of first cells and the plurality of second cells alternately arranged adjacent to each other with a porous partition wall interposed therebetween, wherein a porous film having a porosity higher than that of the partition wall is provided on a surface of each of the first cells, and assuming that a direction in which the first cells of the pillar-shaped honeycomb structure filter extend is an extending direction of a coordinate axis, a coordinate value of the inlet side end surface is 0, and a coordinate value of the outlet side end surface is X, the following relationship is satisfied:

$$(A_1+A_2+A_3)/(B_1+B_2+B_3)>1.0$$

wherein $B_1$ is an average thickness of the porous film in an outer peripheral portion, and $A_1$ is an average thickness of the porous film in a central portion, at a cross-section orthogonal to the direction in which the first cells of the pillar-shaped honeycomb structure filter extend at a coordinate value 0.2X, $B_2$ is an average thickness of the porous film in the outer peripheral portion, and $A_2$ is an average thickness of the porous film in the central portion, at a cross-section orthogonal to the direction in which the first cells of the pillar-shaped honeycomb structure filter extend at a coordinate value 0.5X, and $B_3$ is an average thickness of the porous film in the outer peripheral portion, and $A_3$ is an average thickness of the porous film in the central portion, at a cross-section orthogonal to the direction in which the first cells of the pillar-shaped honeycomb structure filter extend at a coordinate value 0.8X.

[2]

The pillar-shaped honeycomb structure filter according to [1], wherein the following relationship is satisfied.

$$(A_1+A_2+A_3)/(B_1+B_2+B_3)>1.2$$

[3]

The pillar-shaped honeycomb structure filter according to [1] or [2], wherein the following relationships (1) and (2) are satisfied for the first cells located in the central portion of the cross-section orthogonal to the direction in which the first cells of the pillar-shaped honeycomb structure filter extend:
(1) a ratio ($A_2/A_1$) of the average thickness $A_2$ of the porous film at the coordinate value 0.5X to the average thickness $A_1$ of the porous film at the coordinate value 0.2X is 1.05 to 5.0, and
(2) a ratio ($A_3/A_1$) of the average thickness $A_3$ of the porous film at the coordinate value 0.8X to the average thickness $A_1$ of the porous film at the coordinate value 0.2X is 1.05 to 5.0.

[4]

The pillar-shaped honeycomb structure filter according to any one of [1] to [3], wherein the following relationship is satisfied.

$$A_1>B_1, A_2>B_2, \text{ and } A_3>B_3$$

[5]

The pillar-shaped honeycomb structure filter according to any one of [1] to [4], wherein a main component of the porous film is silicon carbide, alumina, silica, cordierite or mullite.

[6]

The pillar-shaped honeycomb structure filter according to any one of [1] to [5], wherein the porosity of the porous film is 70 to 85%.

[7]

The pillar-shaped honeycomb structure filter according to any one of [1] to [6], wherein an average thickness of the entire porous film is 4 to 50 μm.

The pillar-shaped honeycomb structure filter according to an embodiment of the present invention can contribute to improvement of the PM collection performance when the flow velocity of exhaust gas is large.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Pillar-Shaped Honeycomb Structure Filter>

A pillar-shaped honeycomb structure filter according to one embodiment of the present invention will be described. A pillar-shaped honeycomb structure filter can be used as a DPF (Diesel Particulate Filter) or a GPF (Gasoline Particulate Filter) that collect soot, which is installed on an exhaust gas line from a combustion device, typically an engine mounted on a vehicle. The pillar-shaped honeycomb structure filter according to the present invention can be installed in an exhaust pipe, for example.

Figure 1:
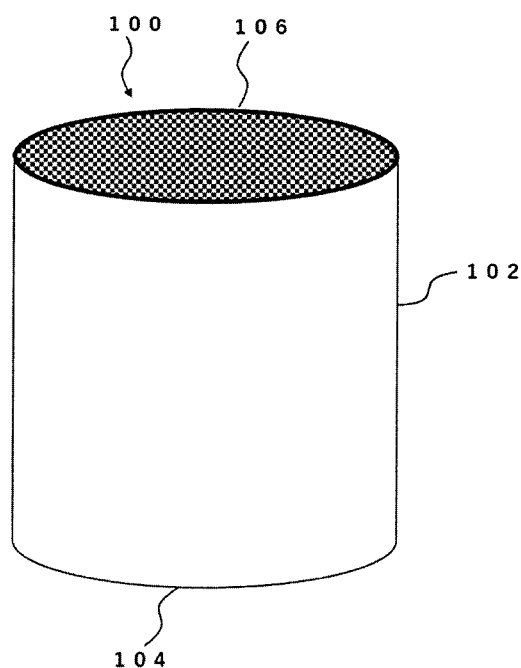
FIG. 1 is a perspective view schematically showing an example of a pillar-shaped honeycomb structure filter.
Figure 2:
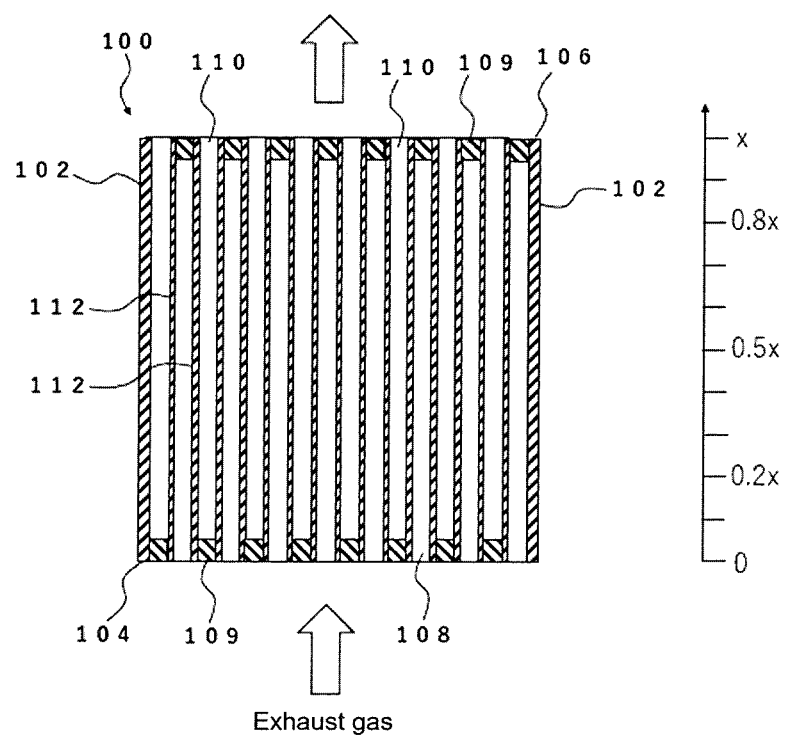
FIG. 2 is a schematic cross-sectional view when an example of a pillar-shaped honeycomb structure filter is observed from a cross-section parallel to the direction in which the cells extend.

FIGS. 1 and 2 illustrate a schematic perspective view and a cross-sectional view of a pillar-shaped honeycomb structure filter (100), respectively. This pillar-shaped honeycomb structure filter (100) comprises an outer peripheral side wall (102), and a plurality of first cells (108) provided on the inner peripheral side of the outer peripheral side wall (102), the plurality of first cells (108) extending from a inlet side end surface (104) to an outlet side end surface (106), each opening on the inlet side end surface (104) and having a plugged portion (109) on the outlet side end surface (106), and a plurality of second cells (110) provided on the inner peripheral side of the outer peripheral side wall (102), the plurality of second cells (110) extending from the inlet side end surface (104) to the outlet side end surface (106), each having a plugged portion (109) on the inlet side end surface (104) and opening on the outlet side end surface (106). In this pillar-shaped honeycomb structure (100), since the first cells (108) and the second cells (110) are alternately arranged adjacent to each other with the porous partition wall (112) interposed therebetween, so that the inlet side end surface (104) and the outlet side end surface (106) each have a honeycomb shape.

When exhaust gas containing particulate matter (PM) such as soot is supplied to the inlet side end surface (104) which is on the upstream side of the pillar-shaped honeycomb structure filter (100), the exhaust gas is introduced into the first cells (108) and proceeds downstream in the first cells (108). Since the first cells (108) have plugged portions (109) on the outlet side end surface (106) which is on the downstream side, the exhaust gas passes through the porous partition walls (112) partitioning the first cells (108) and the second cells (110) and flows into the second cells (110). Since particulate matter cannot pass through the partition walls (112), it is collected and deposited in the first cells (108). After the particulate matter is removed, the clean exhaust gas that has flowed into the second cells (110) proceeds downstream in the second cells (110) and flows out from the outlet side end surface (106) which is on the downstream side.

Figure 3:
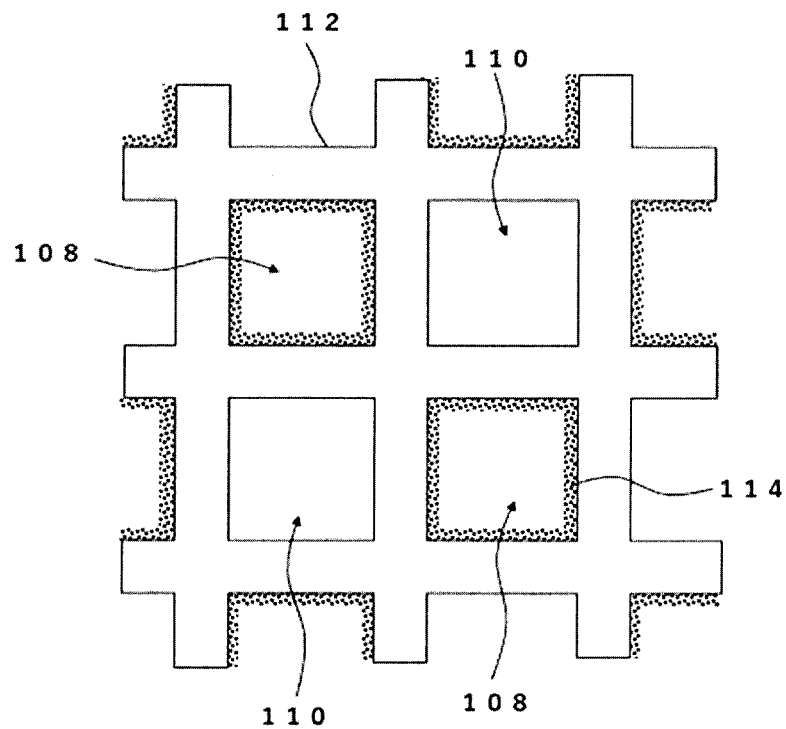
FIG. 3 is a schematic partially enlarged view of a pillar-shaped honeycomb structure filter when observed from a cross-section orthogonal to the direction in which the cells extend.

FIG. 3 shows a schematic partially enlarged view when the pillar-shaped honeycomb structure filter (100) is observed from a cross-section orthogonal to the direction in which the cells (108, 110) extend. On the surface of each of the first cells (108) (equivalent to the surface of the partition wall (112) partitioning the first cell (108)) of the pillar-shaped honeycomb structure filter (100), porous film (114) is formed.

As the flow velocity of the exhaust gas flowing into the pillar-shaped honeycomb structure filter increases, the flow velocity of the exhaust gas passing through the pillar-shaped honeycomb structure filter tends to increase near the central axis rather than near the outer peripheral side wall. Therefore, it is advantageous to make the thickness of the porous film in the vicinity of the central axis larger than that in the vicinity of the outer peripheral side wall in order to improve the PM collection efficiency. Therefore, in one embodiment of the pillar-shaped honeycomb structure filter, assuming that the direction in which the first cells of the pillar-shaped honeycomb structure filter extend is an extending direction of a coordinate axis, the coordinate value of the inlet side end surface is 0, and the coordinate value of the outlet side end surface is X, the following relationship is satisfied.

$$(A_1+A_2+A_3)/(B_1+B_2+B_3)>1.0$$

wherein
$B_1$ is an average thickness of the porous film in the outer peripheral portion, and $A_1$ is an average thickness of the porous film in the central portion, at a cross-section orthogonal to the direction in which the first cells of the pillar-shaped honeycomb structure filter extend at a coordinate value 0.2X,
$B_2$ is an average thickness of the porous film in the outer peripheral portion, and $A_2$ is an average thickness of the porous film in the central portion, at a cross-section orthogonal to the direction in which the first cells of the pillar-shaped honeycomb structure filter extend at a coordinate value 0.5X, and
$B_3$ is an average thickness of the porous film in the outer peripheral portion, and $A_3$ is an average thickness of the porous film in the central portion, at a cross-section orthogonal to the direction in which the first cells of the pillar-shaped honeycomb structure filter extend at a coordinate value 0.8X.

In a preferred embodiment, $(A_1+A_2+A_3)/(B_1+B_2+B_3) \geq 1.2$ is satisfied. In a more preferred embodiment, $(A_1+A_2+A_3)/(B_1+B_2+B_3) \geq 1.7$ is satisfied. In a more preferred embodiment, $(A_1+A_2+A_3)/(B_1+B_2+B_3) \geq 1.8$ is satisfied. In a more preferred embodiment, $(A_1+A_2+A_3)/(B_1+B_2+B_3) \geq 2.0$ is satisfied. The upper limit of $(A_1+A_2+A_3)/(B_1+B_2+B_3)$ is not particularly restricted, but if it becomes excessively large, pressure loss may occur due to steep blockage of the gas flow path. Therefore, $10 \geq (A_1+A_2+A_3)/(B_1+B_2+B_3)$ is preferable, $8 \geq (A_1+A_2+A_3)/(B_1+B_2+B_3)$ is more preferable. Typically, $4 \geq (A_1+A_2+A_3)/(B_1+B_2+B_3)$ is satisfied. More typically, $3 \geq (A_1+A_2+A_3)/(B_1+B_2+B_3)$ is satisfied. Yet more typically, $2.5 \geq (A_1+A_2+A_3)/(B_1+B_2+B_3)$ is satisfied.

$(A_1+A_2+A_3)/3$ can be, for example, 5 to 30 μm, and preferably 10 to 20 μm.

In a preferred embodiment, $A_1 > B_1$, $A_2 > B_2$, and $A_3 > B_3$ are satisfied. In a more preferred embodiment, $A_1/B_1 \geq 1.1$, $A_2/B_2 \geq 1.1$, and $A_3/B_3 \geq 1.1$ are satisfied. In a further more preferred embodiment, $A_1/B_1 \geq 1.4$, $A_2/B_2 \geq 1.4$, and $A_3/B_3 \geq 1.4$ are satisfied. The upper limit of $A_1/B_1$, $A_2/B_2$, and $A_3/B_3$ are not particularly restricted, but if they become excessively large, pressure loss may occur due to steep blockage of the gas flow path. Therefore, $4.0 \geq A_1/B_1$, $4.0 \geq A_2/B_2$, and $4.0 \geq A_3/B_3$ are preferable, and $3.0 \geq A_1/B_1$, $3.0 \geq A_2/B_2$, and $3.0 \geq A_3/B_3$ are more preferable.

Figure 4:
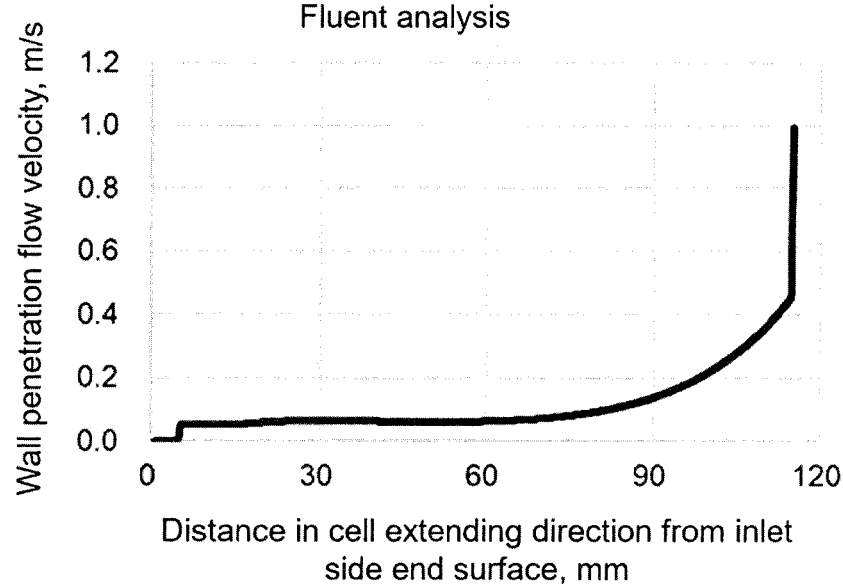
FIG. 4 is a graph showing the results obtained by fluid analysis of the relationship between the distance in the direction in which the cells extend from the inlet side end surface and the flow velocity when exhaust gas flowing into the pillar-shaped honeycomb structure filter passes through the partition walls.

As the flow velocity of the exhaust gas increases, the flow velocity of the exhaust gas when passing through the partition walls of the pillar-shaped honeycomb structure filter tends to increase toward the outlet side end surface. For example, when the flow velocity of the exhaust gas flowing into the pillar-shaped honeycomb structure filter (exhaust gas flow rate/area of the inlet side end surface) is 2.5 m/s or more, typically 12.4 m/s or more, the flow velocity of the exhaust gas when passing through the partition walls of the pillar-shaped honeycomb structure filter becomes remarkably large on the outlet side end surface. FIG. 4 shows the results obtained by fluid analysis of the relationship between the distance in the direction in which the cell extends from the inlet side end surface and the flow velocity when exhaust gas flowing into the pillar-shaped honeycomb structure filter passes through the partition wall of one cell. As can be seen from FIG. 4, it can be seen that the flow velocity of the exhaust gas passing through the partition wall increases remarkably as it becomes closer to the outlet side end surface.

Figure 5:
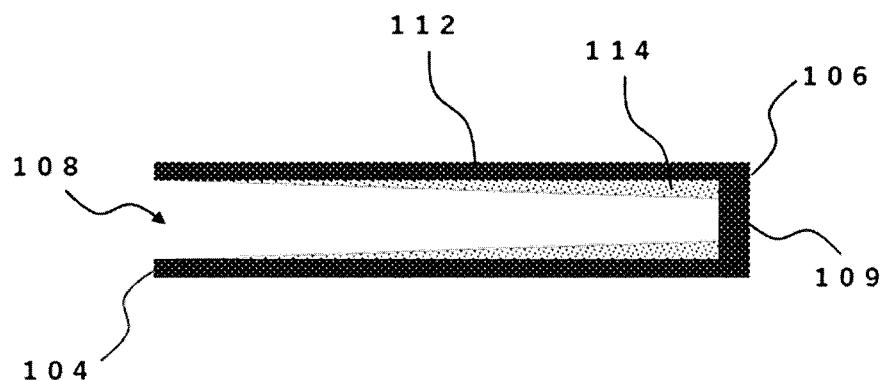
FIG. 5 is a schematic cross-sectional view showing a structural example of the first cells.

<Fluid Analysis Conditions>
Software: Fluent Ver19.1 available from Ansys
Solver type: Pressure-based solver
Turbulence model: Low Reynolds number type SST k-ω
Outer surface: Symmetrical surface condition (no friction occurs)
Solid wall surface: No-slip wall condition (friction occurs)
Outlet: Specified as a gauge pressure of 0 [Pa] (open to the atmosphere)
Fluid flow velocity flowing into the pillar-shaped honeycomb structure filter: 12.4 m/sec, 2.5 m/sec
Fluid density flowing into the pillar-shaped honeycomb structure filter: 1.19 kg/m$^3$
Fluid viscosity flowing into the pillar-shaped honeycomb structure filter: 1.85×10$^{-5}$ kg/m/s
Pillar-shaped honeycomb structure filter dimensions: 120 mm
Cell density of pillar-shaped honeycomb structure filter: 200 cpsi
Partition wall thickness of pillar-shaped honeycomb structure filter: 216 μm The amount of exhaust gas that passes per unit time increases in places where the flow velocity of exhaust gas is high. Therefore, it is possible to improve the PM collection performance by increasing the thickness of the porous film to increase the chances of contact with the porous film. Therefore, by increasing the thickness of the porous film toward the outlet side end surface where the flow velocity of the exhaust gas increases, the PM collection performance can be improved without increasing the pressure loss more than necessary. Therefore, in a preferred embodiment of the pillar-shaped honeycomb structure filter (100), the porous film (114) formed on the surface of each of the first cells (108) (equivalent to the surface of the partition wall partitioning the first cell) have thickness that increases from the inlet side end surface (104) toward the outlet side end surface (106). FIG. 5 shows a schematic cross-sectional view showing a structural example of the first cells (108) of such a pillar-shaped honeycomb structure filter (100).

More specifically, assuming that the direction in which the first cells of the pillar-shaped honeycomb structure filter extend is an extending direction of a coordinate axis, a coordinate value of the inlet side end surface is 0, and a coordinate value of the outlet side end surface is X, the following relationships (1) and (2) are satisfied for the first cells located in the central portion of a cross-section orthogonal to the direction in which the first cells of the pillar-shaped honeycomb structure filter extend:

(1) a ratio ($A_2/A_1$) of the average thickness $A_2$ of the porous film at the coordinate value 0.5X to the average thickness $A_1$ of the porous film at the coordinate value 0.2X is 1.05 to 5.0, and (2) a ratio ($A_3/A_1$) of the average thickness $A_3$ of the porous film at the coordinate value 0.8X to the average thickness $A_1$ of the porous film at the coordinate value 0.2X is 1.05 to 5.0.

The lower limit of $A_2/A_1$ is preferably 1.2 or more, and more preferably 1.4 or more. The upper limit of $A_2/A_1$ is preferably 4.0 or less, and more preferably 3.0 or less.

The lower limit of $A_2/A_1$ is preferably 1.6 or more, and more preferably 1.8 or more. The upper limit of $A_2/A_1$ is preferably 4.0 or less, and more preferably 3.0 or less.

Figure 6:
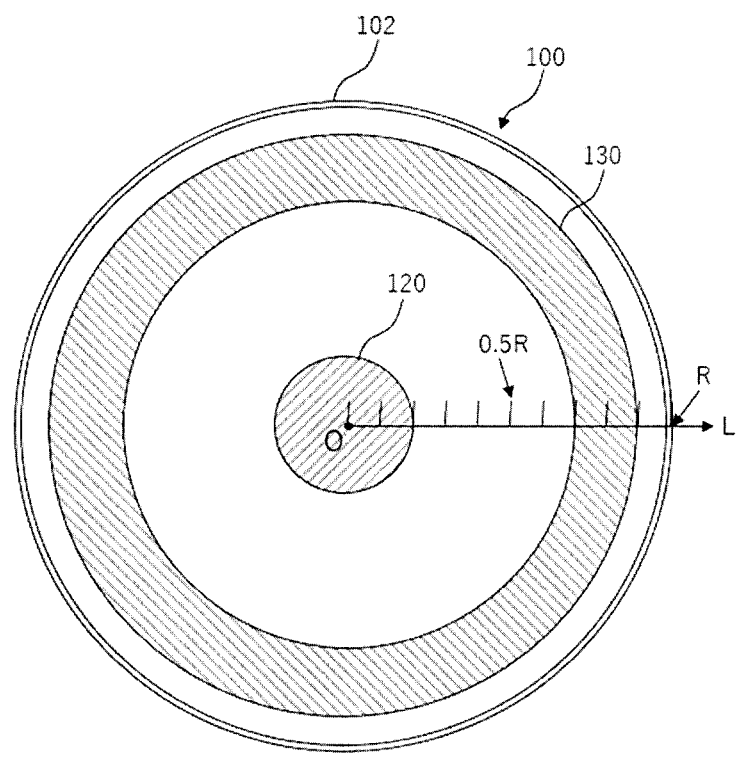
FIG. 6 is a schematic view for explaining the areas of the outer peripheral portion and the central portion of a pillar-shaped honeycomb structure filter.

The central and outer peripheral portions of the pillar-shaped honeycomb structure filter when measuring the average thickness of the porous film at each coordinate value (0.2X, 0.5X, 0.8X) in the direction in which the first cells extend are determined as follows. Referring to FIG. 6, when the pillar-shaped honeycomb structure filter (100) is observed from a cross-section orthogonal to the direction in which the first cells extend, a line segment L is drawn from the center of gravity O of the cross-section toward the outer surface of the outer peripheral side wall (102). Assuming the extending direction of the line segment L is the extending direction of a coordinate axis, the coordinate value at the center of gravity O is 0, and the coordinate value at the outer surface of the outer peripheral side wall is R. In this case, along the line segment L, the range of the coordinate values 0 to 0.2R is the central portion, and the range of the coordinate values 0.7R to 0.9R is the outer peripheral portion. When a large number of such line segments L are drawn in the cross-section and the central portion and the outer peripheral portion on each line segment L are assembled, the areas of the central portion (120) and the outer peripheral portion (130) in the cross-section can be obtained.

$A_1$, $A_2$, $A_3$, $B_1$, $B_2$, and $B_3$ are measured by the following methods, respectively. A cross-section parallel to the direction in which the first cells extend and parallel to the line segment extending from the outer surface of the outer peripheral side wall toward the center of gravity O is cut out from the location (central portion or outer peripheral portion) where the average thickness of the porous film of the pillar-shaped honeycomb structure filter is to be obtained. The cross-section is observed with a 3D shape measuring machine (example: VR-3200 manufactured by KEYENCE CORPORATION) under the conditions of a magnification of 25 times and an observation field of view of 12.5 mm (horizontal)×9.5 mm (vertical). At this time, the observation is performed such that the lateral direction of the observation field of view is parallel to the direction in which the first cells extend. Then, when the average thickness at a specific coordinate value in the direction in which the first cells extend is to be obtained, observation is conducted such that such a coordinate value is located at the center of the observation field of view in the lateral direction. For example, when determining the average thickness at 0.2X, observation is conducted such that 0.2X is located at the center of the observation field of view in the lateral direction.

Figure 7:
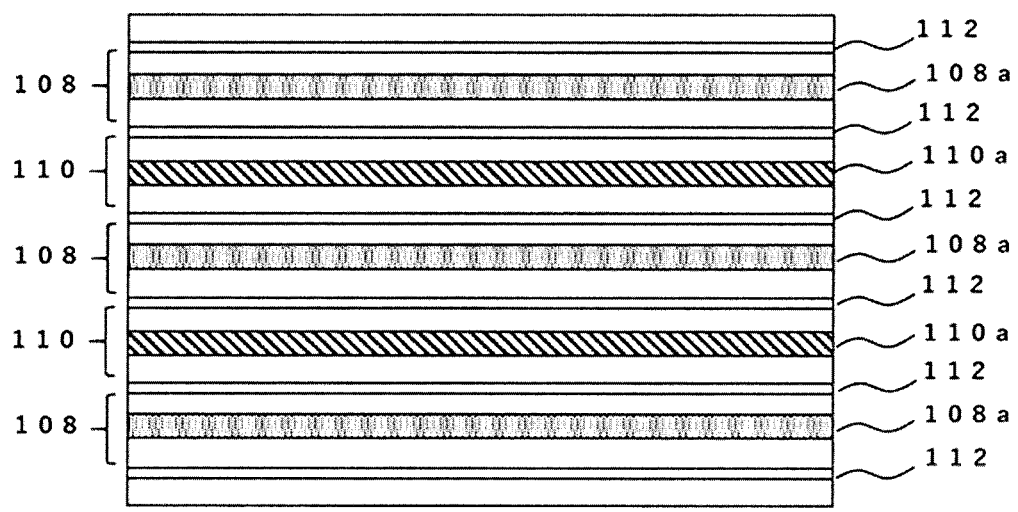
FIG. 7 is a schematic view of a cross-section of a pillar-shaped honeycomb structure filter cut out in order to obtain the average thickness of the porous film.

FIG. 7 shows a schematic view of the cut-out cross-section. By observing the cross-section, the first cells (108) on which the porous film is formed and the second cells (110) on which the porous film is not formed are identified. Next, three first cells (108) adjacent to each other at the position closest to the center on the cross-section are specified. further, the central regions (110a) (reference planes) of two second cells (110) sandwiched between these three adjacent first cells (108) at the position closest to the center on the cross-section are specified, and leveling is performed with image processing software (example: software attached to the 3D shape measuring machine VR-3200 manufactured by KEYENCE) such that the reference planes are the most horizontal based on the profiles of both regions. After the leveling, the central regions (110a) of the two second cells (110) are specified as a measuring range, and the average height H2 of these regions is measured. Further, after the leveling, the central regions (108a) of the three first cells (108) are specified as a measuring range, and the average height H1 of these regions is measured. The difference between the average height H1 and the average height H2 in one field of view is defined as the thickness of the porous film in that field of view. In addition, the central region (108a, 110a) refer to the region of a central portion when the distance between one pair of partition walls (112) that partitions each cell is divided into three equal portions.

The thickness of the porous film in the central portion and the outer peripheral portion at each coordinate value is measured for five fields of view, respectively, and the average value in the five fields of view is deemed as the measured value ($A_1$, $A_2$, $A_3$, $B_1$, $B_2$, $B_3$).

In the present specification, the average value of $A_1$, $A_2$, $A_3$, $B_1$, $B_2$, and $B_3$ is deemed as the average thickness of the entire porous film of the pillar-shaped honeycomb structure filter. The average thickness of the entire porous film can be, for example, 4 to 50 μm. When the average thickness of the entire porous film is 4 μm or more, preferably 10 μm or more, an advantage of improving collection efficiency can be obtained. In addition, when the average thickness of the entire porous film is 50 μm or less, preferably 40 μm or less, more preferably 30 μm or less, and even more preferably 20 μm or less, an advantage of suppressing an increase in pressure loss can be obtained.

In one embodiment, the porosity of the porous film (114) is higher than the porosity of the partition wall (112). If the porosity of the porous film (114) is higher than the porosity of the partition wall (112), there is an advantage that an increase in pressure loss can be suppressed. In this case, the difference between the porosity of the porous film (114) and the porosity (%) of the partition wall (112) is preferably 10% or more, more preferably 20% or more.

The lower limit of the porosity of the porous film is preferably 70% or more from the viewpoint of suppressing an increase in pressure loss. Further, the upper limit of the porosity of the porous film is preferably 85% or less from the viewpoint of suppressing a decrease in collection efficiency.

The porosity of the porous film is measured as follows. For each cross-section used when determining the average film thickness of the porous film at each of $A_1$, $A_2$, $A_3$, $B_1$, $B_2$, and $B_3$, an in-lens reflected electron image is imaged in any two fields of view of the central region (108a) of the first cell (108) on which the porous film is formed by using a field emission scanning electron microscope (abbreviation: FE-SEM) (example: model ULTRA55 manufactured by ZEISS). Next, an image analysis software (example: HAL-CON) is used to binarize the image by the mode method, divide it into film material portions and void portions, calculate the ratio of the film material portions and the void portions, which is deemed as the porosity of the porous film at each of $A_1$, $A_2$, $A_3$, $B_1$, $B_2$, and $B_3$. Then, the average value of all of these is taken as the porosity of the porous film of the pillar-shaped honeycomb structure filter.

The lower limit of the porosity of the partition wall is preferably 40% or more, more preferably 45% or more, and even more preferably 50% or more, from the viewpoint of suppressing the pressure loss of the exhaust gas. In addition, the upper limit of the porosity of the partition wall is preferably 80% or less, more preferably 75% or less, and even more preferably 70% or less, from the viewpoint of ensuring the strength of the pillar-shaped honeycomb structure filter. The porosity of the partition wall refers to the value measured with a mercury intrusion porosimeter in accordance with JIS-R1655: 2003.

The porous film may be composed of ceramics. For example, the porous film may contain one or more ceramics selected from cordierite, silicon carbide (SiC), talc, mica, mullite, potsherd, aluminum titanate, alumina, silicon nitride, sialon, zirconium phosphate, zirconia, titania and silica. The main component of the porous film is preferably silicon carbide, alumina, silica, cordierite or mullite. Among these, it is preferable that the main component of the porous film is silicon carbide, because the presence of the surface oxide film ($Si_2O$) allows the porous film to be firmly bonded to each other and difficult to peel off. The main component of the porous film refers to a component that occupies 50% by mass or more of the porous film. The porous film preferably comprises 50% by mass or more, more preferably 70% by mass or more, and even more preferably 90% by mass or more of SiC. The shape of the ceramics constituting the porous film is not particularly limited, and examples thereof include granular forms.

Examples of the material constituting the porous partition walls and the outer peripheral side wall of the pillar-shaped honeycomb structure filter according to the present embodiment include, but are not limited to, porous ceramics. Examples of ceramics include cordierite, mullite, zirconium phosphate, aluminum titanate, silicon carbide (SiC), silicon-silicon carbide composite (example: Si-bonded SiC), cordierite-silicon carbide composites, zirconia, spinel, indialite, sapphirine, corundum, titania, silicon nitride, and the like. As the ceramics, one type may be contained alone, or two or more types may be contained at the same time.

The pillar-shaped honeycomb structure filter may carry a PM combustion catalyst that assists combustion of PM such as soot, an oxidation catalyst (DOC), a SCR catalyst and a NSR catalyst for removing nitrogen oxides (NOx), and a three-way catalyst that can remove hydrocarbon (HC), carbon monoxide (CO) and nitrogen oxides (NOx) at the same time. However, it is preferable that the pillar-shaped honeycomb structure filter according to the present embodiment does not carry a catalyst. This is because if the thinner portion of the porous film (example: the outer peripheral portions, the vicinity of the inlet) is coated with a catalyst, the catalyst may seep out from the outer peripheral side wall of the pillar-shaped honeycomb structure filter.

The shape of the end surfaces of the pillar-shaped honeycomb structure filter is not limited, and it may be, for example, a round shape such as a circle, an ellipse, a race track shape, or an oval shape, or a polygon such as a triangle or a quadrangle. The pillar-shaped honeycomb structure (100) of FIG. 1 has a circular end surface and is cylindrical as a whole.

The height of the pillar-shaped honeycomb structure filter (the length from the inlet side end surface to the outlet side end surface) is not particularly limited and may be appropriately set according to the application and required performance. There is no particular limitation on the relationship between the height of the pillar-shaped honeycomb structure filter and the maximum diameter of each end surface (referring to the maximum length of the diameters passing through the center of gravity of each end surface of the pillar-shaped honeycomb structure filter). Therefore, the height of the pillar-shaped honeycomb structure filter may be longer than the maximum diameter of each end surface, or the height of the pillar-shaped honeycomb structure filter may be shorter than the maximum diameter of each end surface.

The shape of the cells in the cross-section perpendicular to the flow path direction of the cells is not limited, but is preferably a quadrangle, a hexagon, an octagon, or a combination thereof. Among these, squares and hexagons are preferred. By making the shape of the cells in this way, it is possible to reduce the pressure loss when a fluid passes through the pillar-shaped honeycomb structure.

The upper limit of the average thickness of the partition wall in the pillar-shaped honeycomb structure filter is preferably 0.305 mm or less, more preferably 0.254 mm or less, and even more preferably 0.241 mm or less, from the viewpoint of suppressing the pressure loss. However, from the viewpoint of ensuring the strength of the pillar-shaped honeycomb structure filter, the lower limit of the average thickness of the partition wall is preferably 0.152 mm or more, more preferably 0.178 mm or more, and even more preferably 0.203 mm or more. In the present specification, the thickness of the partition wall refers to a crossing length at which a line segment crosses the partition wall when the centers of gravity of adjacent cells are connected by this line segment in a cross-section perpendicular to the direction in which the cells extend. The average thickness of partition wall refers to the average value of the thickness of all the partition walls.

The cell density (number of cells per unit cross-sectional area perpendicular to the direction in which the cells extend) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 400 cells/square inch (15.5 to 62.0 cells/cm$^2$).

The pillar-shaped honeycomb structure filter can be provided as an integrally formed product. Further, the pillar-shaped honeycomb structure filter can also be provided as a segment joint body by joining and integrating a plurality of pillar-shaped honeycomb structure filter segments at their side surfaces, each having an outer peripheral side wall. By providing the pillar-shaped honeycomb structure filter as a segment joint body, the thermal shock resistance can be enhanced.

2. Method for Manufacturing Pillar-Shaped Honeycomb Structure Filter

A method for manufacturing a pillar-shaped honeycomb structure filter will be exemplified as below. First, a green body is formed by kneading a raw material composition comprising a ceramic raw material, a dispersion medium, a pore-forming material, and a binder. Next, the green body is subject to extrusion molding to prepare a pillar-shaped honeycomb formed body as desired. Additives such as a dispersant can be added to the raw material composition as needed. During extrusion molding, a die having a desired overall shape, cell shape, partition wall thickness, cell density and the like can be used.

After the pillar-shaped honeycomb formed body is dried, plugged portions are formed at predetermined positions on both end surfaces of the pillar-shaped honeycomb formed body, and then the plugged portions are dried to obtain a pillar-shaped honeycomb formed body having the plugged portions. After that, by degreasing and firing the pillar-shaped honeycomb formed body, a pillar-shaped honeycomb structure is obtained. After that, by forming porous film on the surface of the first cells of the pillar-shaped honeycomb structure, a pillar-shaped honeycomb structure filter is obtained.

As the ceramic raw material, a raw material capable of forming the above-mentioned ceramics after firing can be used. The ceramic raw material can be provided, for example, in the form of powder. Examples of the ceramic raw material include a raw material for obtaining ceramics such as cordierite, mullite, zircon, aluminum titanate, silicon carbide, silicon nitride, zirconia, spinel, indialite, sapphirine, corundum, titania, and the like. Specific examples thereof include, but are not limited to, silica, talc, alumina, kaolin, serpentine, pyrophyllite, brucite, boehmite, mullite, magnesite, aluminum hydroxide, and the like. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material has a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming material is not particularly limited as long as it becomes pores after firing, and examples thereof include, wheat flour, starch, foamed resin, water-absorbing resin, porous silica, carbon (example: graphite), ceramic balloon, polyethylene, polystyrene, polypropylene, nylon, polyester, acrylic and phenol, and the like. As the pore-forming material, one type may be used alone, or two or more types may be used in combination. From the viewpoint of increasing the porosity of the fired body, the amount of the pore-forming material is preferably 0.5 parts by mass or more, more preferably 2 parts by mass or more, and even more preferably 3 parts by mass or more with respect to 100 parts by mass of the ceramic raw material. From the viewpoint of ensuring the strength of the fired body, the amount of the pore-forming material is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropyl methyl cellulose, hydroxyethyl cellulose, carboxymethyl cellulose, and polyvinyl alcohol. In particular, it is preferable to use methyl cellulose and hydroxypropyl methyl cellulose in combination. Further, from the viewpoint of increasing the strength of the honeycomb formed body, the amount of the binder is preferably 4 parts by mass or more, more preferably 5 parts by mass or more, and even more preferably 6 parts by mass or more with respect to 100 parts by mass of the ceramic raw material. From the viewpoint of suppressing the occurrence of cracking due to abnormal heat generation in the firing step, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The method for plugging the end surfaces of the pillar-shaped honeycomb formed body is not particularly limited, and a known method can be adopted. The material of the plugged portion is not particularly limited, but ceramics are preferable from the viewpoint of strength and heat resistance. As the ceramics, it is preferably a ceramic material comprising at least one selected from the group consisting of cordierite, mullite, zircon, aluminum titanate, silicon carbide, silicon nitride, zirconia, spinel, indialite, sapphirine, corundum, and titania. It is even more preferable that the plugged portion has the same material composition as the main body portion of the honeycomb formed body because the expansion coefficient at the time of firing can be the same so that the durability is improved.

After drying the honeycomb formed body, a pillar-shaped honeycomb structure can be manufactured by performing degreasing and firing. As for the conditions of the drying process, the degreasing process, and the firing process, known conditions may be adopted according to the material composition of the honeycomb formed body, and no particular explanation is required. However, specific examples of the conditions are given below.

In the drying process, conventionally known drying methods such as hot gas drying, microwave drying, dielectric drying, reduced-pressure drying, vacuum drying, and freeze drying can be used. Among these, a drying method that combines hot gas drying with microwave drying or dielectric drying is preferable in that the entire formed body can be dried quickly and uniformly.

When forming the plugged portions, it is preferable to form the plugged portions on both end surfaces of the dried honeycomb formed body and then dry the plugged portions. The plugged portions are formed at predetermined positions so that a plurality of first cells extending from the inlet side end surface to the outlet side end surface, each opening on the inlet side end surface and having a plugged portion on the outlet side end surface, and a plurality of second cells extending from the inlet side end surface to the outlet side end surface, each having a plugged portion on the inlet side end surface and opening on the outlet side end surface, are alternately arranged adjacent to each other with a porous partition wall interposed therebetween.

Next, the degreasing process will be described. The combustion temperature of the binder is about 200° C., and the combustion temperature of the pore-forming material is about 300 to 1000° C. Therefore, the degreasing process may be carried out by heating the honeycomb formed body in the range of about 200 to 1000° C. The heating time is not particularly limited, but is normally about 10 to 100 hours. The honeycomb formed body after the degreasing step is called a calcined body.

Though the firing process depends on the material composition of the honeycomb formed body, it can be performed, for example, by heating the calcined body to 1350 to 1600° C. and keeping it for 3 to 10 hours. In this way, a pillar-shaped honeycomb structure comprising a plurality of first cells extending from the inlet side end surface to the outlet side end surface, each opening on the inlet side end surface and having a plugged portion on the outlet side end surface, and a plurality of second cells extending from the inlet side end surface to the outlet side end surface, each having a plugged portion on the inlet side end surface and opening on the outlet side end surface, the plurality of first cells and the plurality of second cells being alternately arranged adjacent to each other with the porous partition wall interposed therebetween can be prepared.

Next, a porous film is formed on the surface of the first cells of the pillar-shaped honeycomb structure that has undergone the firing process. First, a step of attaching ceramic particles to a surface of the first cells by ejecting an aerosol comprising the ceramic particles toward the central portion of the inlet side end surface of the pillar-shaped honeycomb structure from a direction perpendicular to the inlet side end surface while applying a suction force to the outlet side end surface to suck the ejected aerosol from the inlet side end surface is carried out. At this time, by shortening the distance between the aerosol ejection nozzle and the inlet side end surface, or by increasing the ejection speed of the aerosol, or by increasing the suction force applied to the outlet side end surface, it is possible to increase the proportion of ceramic particles attached to the central portion of the pillar-shaped honeycomb structure. As an example, the distance between the aerosol ejection nozzle and the inlet side end surface can be 500 mm to 2000 mm, and the aerosol ejection speed can be 2 to 80 m/s.

As for the ceramic particles in the aerosol, in a volume-based cumulative particle diameter distribution measured by a laser diffraction/scattering method, the median diameter (D50) is preferably 0.5 to 5.0 μm, more preferably 1.0 to 3.0 μm. By ejecting extremely fine ceramic particles, it becomes possible to increase the porosity of the obtained porous film.

Further, it is desirable that the ceramic particles in the aerosol have little aggregation. By suppressing the aggregation of ceramic particles in the aerosol, it is possible to promote the miniaturization of the average pore diameter of the porous film.

As the ceramic particles, the above-mentioned ceramic particles constituting the porous film are used. For example, ceramic particles comprising one or two or more selected from the group consisting of cordierite, silicon carbide (SiC), talc, mica, mullite, potsherd, aluminum titanate, alumina, silicon nitride, sialon, zirconium phosphate, zirconia, titania and silica can be used. The main component of the ceramic particles is preferably silicon carbide, alumina, silica, cordierite or mullite. The main component of the ceramic particles refers to a component that occupies 50% by mass or more of the ceramic particles. The ceramic particles preferably comprise 50% by mass or more, more preferably 70% by mass or more, and even more preferably 90% by mass or more of SiC.

When carrying out the step of attaching ceramic particles to the surface of the first cells, in order to increase the thickness of the porous film from the inlet side end surface toward the outlet side end surface of the pillar-shaped honeycomb structure filter, it is preferable to increase the suction force on the outlet side end surface to increase the flow velocity of the aerosol flowing into the pillar-shaped honeycomb structure. Specifically, the lower limit of the average flow velocity (=aerosol flow rate/area of the inlet side end surface) of the aerosol flowing into the pillar-shaped honeycomb structure is preferably 2 m/s or more, and more preferably 4 m/s or more. Further, in order to maintain a high porosity of the porous film, the upper limit of the average flow velocity of the aerosol flowing into the pillar-shaped honeycomb structure is preferably 80 m/s or less, and preferably 60 m/s or less.

Figure 8:
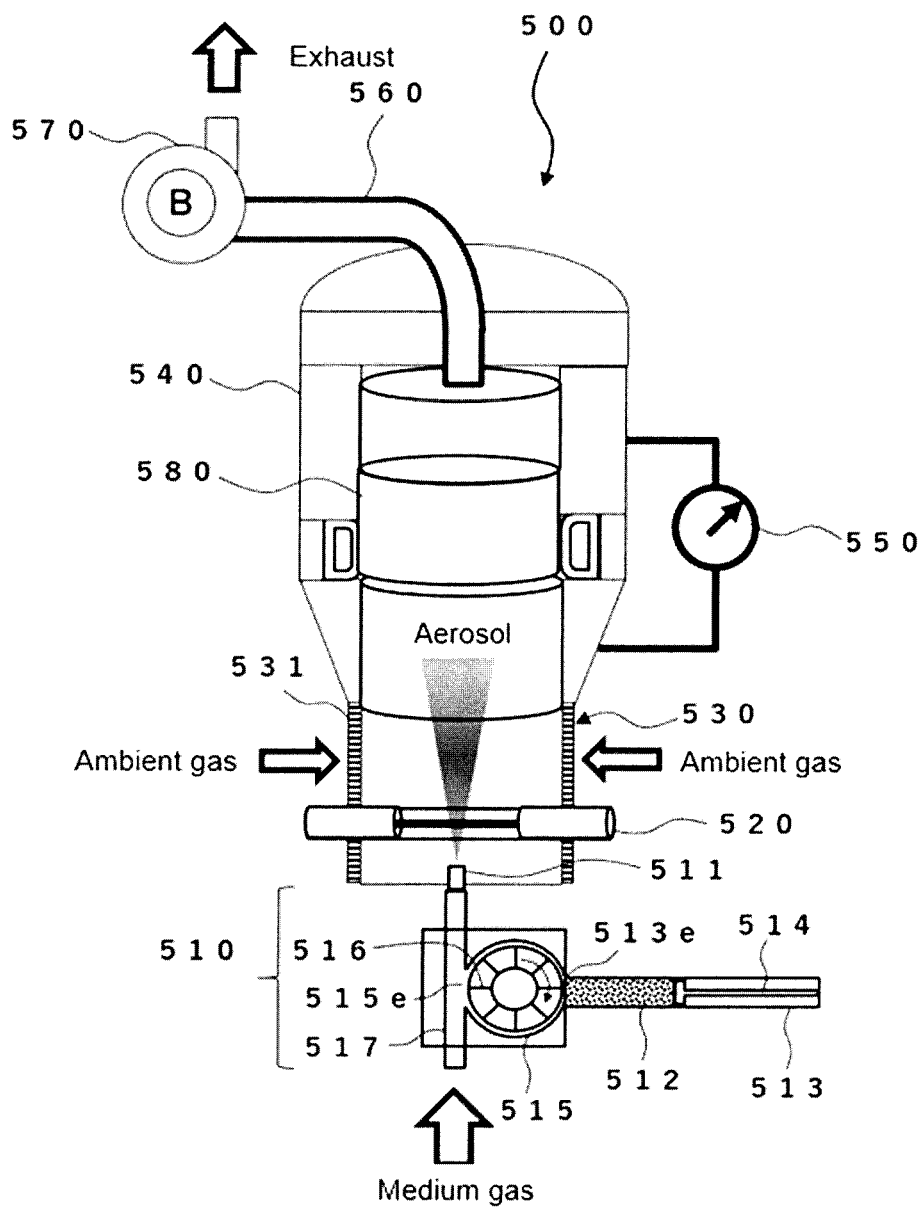
FIG. 8 is a schematic diagram for explaining a configuration of a particle attaching device according to one embodiment of the present invention.

FIG. 8 schematically shows a device configuration of a particle attaching device (500) suitable for carrying out the step of attaching ceramic particles to the surface of the first cells of the pillar-shaped honeycomb structure (580). The particle attaching device (500) comprises an aerosol generator (510), a laser diffraction type particle diameter distribution measuring device (520), a gas introduction pipe (530), a holder (540), a differential pressure gauge (550), an exhaust pipe (560) and a blower (570).

The aerosol generator (510) comprises:
a cylinder (513) for accommodating ceramic particles (512),
a piston or a screw (514) for sending out the ceramic particles (512) accommodated in the cylinder (513) from a cylinder outlet (513*e*),
a loosening chamber (515) communicating with the cylinder outlet (513*e*), comprising a rotating body (516) for loosening the ceramic particles (512) sent out from the cylinder outlet (513*e*), and
a gas flow path for flowing a medium gas (517), communicating with a loosening chamber outlet (515*e*) on the way and can eject an aerosol comprising the medium gas and the ceramic particles (512) from a nozzle (511) attached to the tip thereof.

The aerosol generator (510) can eject aerosol from the nozzle (511). Ceramic particles (512) adjusted to a predetermined particle diameter distribution are accommodated in the cylinder (513). The ceramic particles (512) accommodated in the cylinder (513) are pushed out from the cylinder outlet (513*e*) by a piston or a screw (514). The piston or screw (514) can be configured to be able to adjust the discharging rate of the ceramic particles (512). The ceramic particles (512) discharged from the cylinder outlet (513*e*) enter the loosening chamber (515). The ceramic particles (512) introduced into the loosening chamber (515) move in the loosening chamber (515) while being loosened by the rotating body (516), and are discharged from the loosening chamber outlet (515*e*). As the rotating body (516), for example, a rotating brush can be adopted. The rotating body (516) can be driven by a motor, and configured to control its rotation speed.

The ceramic particles (512) discharged from the loosening chamber outlet (515*e*) are mixed with the medium gas flowing through the gas flow path (517) to form an aerosol, which is ejected from the nozzle (511). It is preferable that the nozzle (511) be installed at a position and orientation in which the aerosol is ejected in a direction perpendicular to the inlet side end surface toward the central portion of the inlet side end surface of the pillar-shaped honeycomb structure (580) held by the holder (540).

The ejection flow rate of the aerosol from the nozzle (511) can be controlled by using a compressed gas such as compressed air whose pressure has been adjusted as the medium gas. As the medium gas, it is preferable to use dry air (for example, with a dew point of 10° C. or less) in order to suppress the aggregation of the ceramic particles. In addition, in the present specification, the "dew point" refers to a value measured by a polymer-type capacitive dew point meter in accordance with JIS Z8806: 2001.

Fine ceramic particles have a property of easily aggregating. However, by using the aerosol generator (510) according to the present embodiment, the loosened ceramic particles are ejected, so it is possible to attach the ceramic particles having the desired particle diameter distribution in which aggregation is suppressed to the surface of the first cells.

The aerosol ejected from the aerosol generator (511) passes through the gas introduction pipe (530) by the suction force from the blower (570), and then sucked into the first cells of the pillar-shaped honeycomb structure (580) from the inlet side end surface of the pillar-shaped honeycomb structure (580) held by the holder (540). The ceramic particles in the aerosol sucked into the first cells attach to the surface of the first cells.

A plurality of ventilation holes (531) is provided on the wall surface of the gas introduction pipe (530), and it is possible to suck in ambient gas such as air. Thereby, the gas flow rate flowing into the gas introduction pipe (530) can be adjusted according to the suction force from the blower (570). A filter may be installed in the ventilation holes (531) because there is a possibility of entraining agglomerated powders, honeycomb fragments and dust.

In the present embodiment, a laser diffraction type particle diameter distribution measuring device (520) is installed in the gas introduction pipe (530), and the particle diameter distribution of the ceramic particles in the aerosol ejected from the aerosol generator (510) can be measured in real time. Thereby, it is possible to monitor whether or not ceramic particles having a desired particle diameter distribution are supplied to the pillar-shaped honeycomb structure (580).

The exhaust pipe (560) connected to the blower (570) is provided on the downstream side of the outlet side end surface of the pillar-shaped honeycomb structure (580). Therefore, when the aerosol from which the ceramic particles have been removed is discharged from the outlet side end surface of the pillar-shaped honeycomb structure (580), it passes through the exhaust pipe (560) and then is exhausted through the blower (570).

When the step of attaching the ceramic particles to the surface of the first cells proceeds, the pressure loss between the inlet side end surface and the outlet side end surface of the pillar-shaped honeycomb structure increases as the amount of the attached ceramic particles increases. Therefore, by obtaining a relationship between the amount of attached ceramic particles and the pressure loss in advance, it is possible to determine the end point of the step of attaching the ceramic particles to the surface of the first cells based on the pressure loss. Therefore, the particle attaching device (500) can be provided with a differential pressure gauge (550) for measuring the pressure loss between the inlet side end surface and the outlet side end surface of the pillar-shaped honeycomb structure (580), and the end point of the step may be determined based on the value of the differential pressure gauge.

When the step of attaching the ceramic particles to the surface of the first cells is carried out, the ceramic particles are also attached to the inlet side end surface (504) of the pillar-shaped honeycomb structure (500). Therefore, it is preferable to remove the ceramic particles by suction with a vacuum or the like while leveling the inlet side end surface with a jig such as a scraper.

Then, the pillar-shaped honeycomb structure filter in which the ceramic particles are attached to the surface of the first cells is heat-treated under conditions of keeping at a maximum temperature of 1000° C. or higher for 1 hour or longer, typically under conditions of keeping a maximum temperature of 1100° C. to 1400° C. for 1 hour to 6 hours, to finish the pillar-shaped honeycomb structure filter. The heat treatment can be carried out, for example, by placing a pillar-shaped honeycomb structure in an electric furnace or a gas furnace. By the heat treatment, the ceramic particles are bonded to each other, and the ceramic particles are burnt on the partition walls of the first cells to form porous film on the surface of the first cells. When the heat treatment is carried out under oxygen-containing conditions such as air, a surface oxide film is formed on the surface of the ceramic particles to promote bonding between the ceramic particles. As a result, porous film that is difficult to peel off can be obtained.

The configuration of the aerosol generator that can be adopted in the particle attaching device capable of carrying out the step of attaching ceramic particles to the surface of the first cells of a pillar-shaped honeycomb structure is not limited to the above-described embodiment, and other embodiments may be adopted. Illustratively, other configuration examples of aerosol generators are schematically shown in FIGS. 9 to 10.

Figure 9:
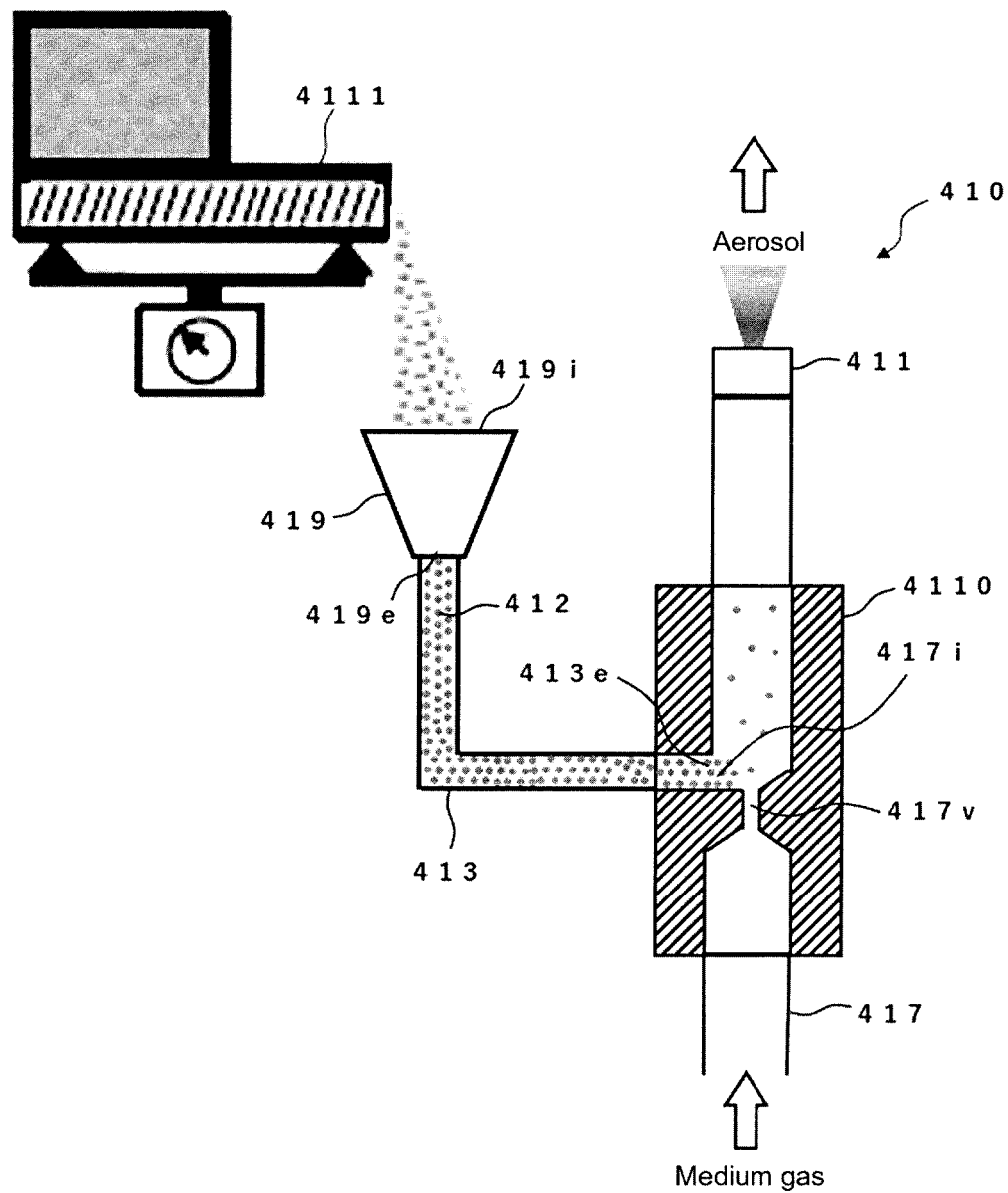
FIG. 9 is a schematic diagram for explaining another configuration example of an aerosol generator applicable to the particle attaching device according to one embodiment of the present invention.
Figure 10:
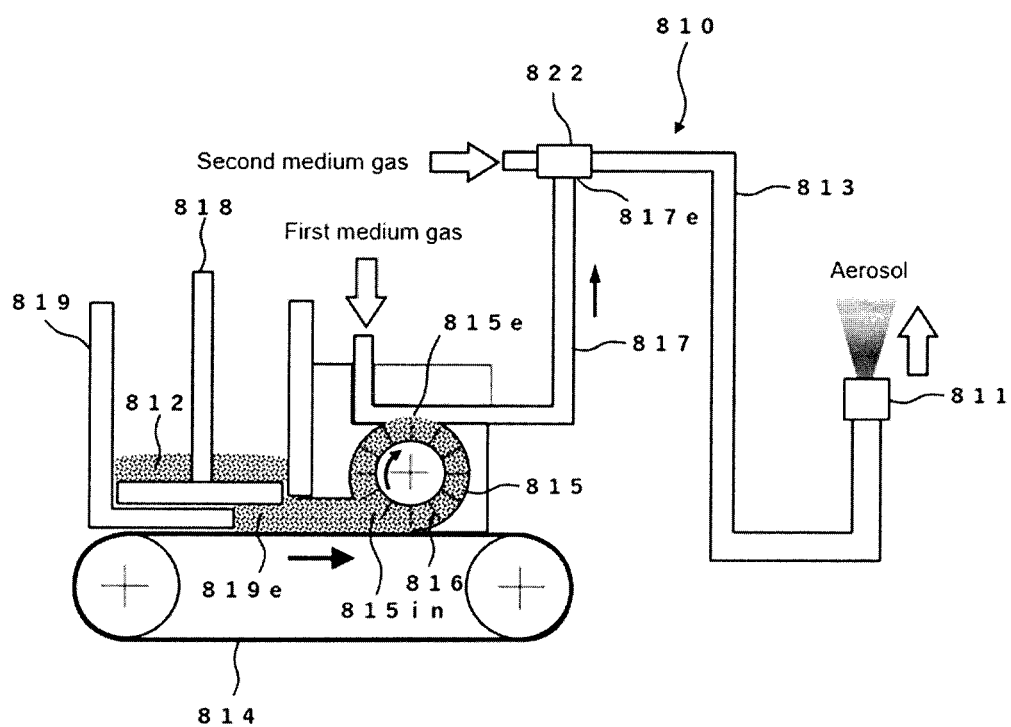
FIG. 10 is a schematic diagram for explaining yet another configuration example of an aerosol generator applicable to the particle attaching device according to one embodiment of the present invention.

The aerosol generator (410) shown in FIG. 9 comprises:
a medium gas flow path (417) for flowing a pressurized medium gas,
a supply port (417i) provided on the way of the medium gas flow path (417) and capable of sucking ceramic particles (412) from the outer peripheral side of the medium gas flow path (417) toward the inside of the medium gas flow path (417),
a nozzle (411) attached to the tip of the medium gas flow path (417) and capable of ejecting an aerosol,
a flow path (413) for sucking and transporting the ceramic particles (412), which comprises an outlet (413e) communicating with the supply port (417i), and
an accommodation unit (419) for accommodating the ceramic particles (412) and supplying the ceramic particles (412) to the flow path (413) for sucking and transporting.

For example, a funnel can be used in the accommodation unit (419). Ceramic particles adjusted to a predetermined particle diameter distribution are accommodated in the accommodation unit (419). The ceramic particles (412) accommodated in the accommodation unit (419) receive the suction force from the medium gas flow path (417), and flow through the outlet (419e) provided at the bottom of the accommodation unit (419). After being transported to the outlet (413e) through the flow path (413), it is introduced into the medium gas flow path (417) from the supply port (417i). At this time, the ambient gas (typically air) sucked from the accommodation unit inlet (419i) is also introduced into the medium gas flow path (417) through the flow path (413) together with the ceramic particles (412). In the present embodiment, the outlet (413e) and the supply port (417i) are in common. Further, in the present embodiment, the ceramic particles (412) are introduced into the medium gas flow path (417) from a direction substantially perpendicular to the flow direction of the medium gas flowing through the medium gas flow path (417).

The ceramic particles (412) supplied into the medium gas flow path (417) collide with the medium gas flowing through the medium gas flow path (417), and are mixed while being loosened to form an aerosol, and are ejected from the nozzle (411). The nozzle (411) is preferably installed at a position and orientation in which the aerosol is ejected in a direction perpendicular to the inlet side end surface of the pillar-shaped honeycomb structure. More preferably, the nozzle (411) is installed at a position and orientation in which the aerosol is ejected in a direction perpendicular to the inlet side end surface toward the central portion of the inlet side end surface.

The supply of the ceramic particles (412) to the accommodation unit (419) is not limited, but is preferably carried out using, for example, a powder metering feeder (4111) such as a screw feeder and a belt conveyor. The ceramic particles (412) discharged from the powder metering feeder (4111) can be dropped into the accommodation unit (419) by gravity.

In a preferred embodiment, the medium gas flow path (417) comprises on the way thereof a venturi portion (417*v*) where the flow path is narrowed, and the supply port (417*i*) is provided on the downstream side of the narrowest flow path location in the venturi portion (417*v*). If the medium gas flow path (417) has a venturi portion (417*v*), the speed of the medium gas passing through the venturi portion (417*v*) increases. Therefore, medium gas with a higher speed can be made to collide with the ceramic particles (412) supplied downstream of the venturi portion (417*v*), so that the loosening force is improved. In order to increase the loosening force of the medium gas, it is more preferable that the supply port (417*i*) is provided on the downstream side of the narrowest flow path location in the venturi portion (417*v*) and adjacent to this location. The configuration can be realized, for example, by connecting the medium gas flow path (417) and the flow path (413) for sucking and transporting by using a venturi ejector (4110).

When the venturi ejector (4110) is used, for example, when the medium gas passes through the medium gas flow path (417), a large suction force can be applied to the flow path (413) for sucking and transporting, and it is possible to prevent the flow path (413) for sucking and transporting from being clogged by the ceramic particles (412). The venturi ejector (4110) is also effective as a means for removing the ceramic particles (412) when the flow path (413) for sucking and transporting is clogged with the ceramic particles (412).

By using a compressed gas such as compressed air whose pressure has been adjusted as the medium gas, the ejection flow rate of the aerosol from the nozzle (411) can be controlled. As the medium gas, it is preferable to use dry air (for example, with a dew point of 10° C. or less) in order to suppress the aggregation of the ceramic particles.

Fine ceramic particles have a property of easily aggregating. However, by using the aerosol generator (410) according to the present embodiment, it is possible to eject ceramic particles having a target particle diameter distribution with suppressed aggregation.

The aerosol generator (810) shown in FIG. 10 comprises:

a belt feeder (814) for transporting ceramic particles (812), a loosening chamber (815) for receiving the ceramic particles (812) transported from the belt feeder (814), comprising a rotating body (816) for loosening the received ceramic particles (812), a first gas flow path (817) for flowing a first medium gas, which communicates with a loosening chamber outlet (815*e*) on the way, and a second gas flow path (813) for flowing a second medium gas, which communicates with an outlet (817*e*) of the first gas flow path (817) on the way, the second gas flow path (813) being capable of ejecting an aerosol comprising the first medium gas, the second medium gas, and the ceramic particles (812) from a nozzle (811) attached to the tip thereof.

The aerosol generator (810) has a container (819) for accommodating the ceramic particles (812). The ceramic particles (812) in the container (819) are preferably stirred by a stirrer (818). A discharge port (819*e*) for the ceramic particles (812) is provided at the bottom of the container (819). The ceramic particles (812) discharged from the discharge port (819*e*) are conveyed to an inlet (815*in*) of the loosening chamber (815) by the belt feeder (814).

The ceramic particles (812) introduced into the loosening chamber (815) move in the loosening chamber (815) while being loosened by the rotating body (816), and are discharged from the loosening chamber outlet (815*e*). As the rotating body (816), for example, a rotating brush can be adopted. The rotating body (816) can be driven by a motor, and configured to control its rotation speed.

Fine ceramic particles have a property of easily aggregating. However, by using the aerosol generator (810) according to the present embodiment, the loosened ceramic particles are ejected, so it is possible to attach the ceramic particles having the desired particle diameter distribution with suppressed aggregation to the surface of the first cells.

The ceramic particles (812) discharged from the loosening chamber outlet (815*e*) are mixed with the first medium gas flowing through the first gas flow path (817), and head toward the outlet (817*e*) of the first gas flow path (817). The second gas flow path (813) communicates with the outlet (817*e*) of the first gas flow path (817) on the way, where the second medium gas meets with the first medium gas and the ceramic particles (812). Then, the aerosol containing the first medium gas, the second medium gas, and the ceramic particles (812) flows downstream in the second gas flow path (813). The aerosol is then ejected from a nozzle (811) attached to the tip of the second gas flow path (813). As the first medium gas, ambient gas such as air may be used, but it is preferable to use dry air (for example, with a dew point of 10° C. or less) in order to suppress the aggregation of the ceramic particles. Further, the first medium gas may be transported only by the suction force from the second gas flow path, or may be pumped by using a compressor or the like. By using a compressed gas such as compressed air whose pressure has been adjusted as the second medium gas, the ejection flow rate of the aerosol from the nozzle (811) can be controlled. As for the second medium gas, it is preferable to use dry air as in the case of the first medium gas.

The first gas flow path (817) and the second gas flow path (813) can be connected by using an ejector (822), particularly a Venturi ejector. With an ejector (822), particularly the Venturi ejector, in addition to the effect of loosening the ceramic particles (812) by the loosening chamber (815), the ceramic particles (812) loosened by passing through the loosening chamber (815) collide with the second medium gas, so that the effect of loosening the ceramic particles (812) by the second medium gas can also be obtained, and a high aggregation suppressing effect can be obtained. By using an ejector (822), for example, when the second medium gas is flowed through the second gas flow path (813) as a driving fluid, a large suction force can be applied to the first gas flow path (817), and it is possible to prevent the first gas flow path (817) from being clogged with the ceramic particles (812). Further, an ejector (822) is also effective as a means for removing the ceramic particles when the first gas flow path (817) is clogged with the ceramic particles (812).

EXAMPLES

Hereinafter, examples for better understanding the present invention and its advantages will be illustrated, but the present invention is not limited to the examples.

Example 1

(1) Manufacture of Pillar-Shaped Honeycomb Structure

To 100 parts by mass of the cordierite-forming raw material, 3 parts by mass of the pore-forming material, 55 parts by mass of the dispersion medium, 6 parts by mass of the organic binder, and 1 part by mass of the dispersant were added, mixed and kneaded to prepare a green body. Alumina, aluminum hydroxide, kaolin, talc, and silica were used as the cordierite-forming raw material. Water was used as the dispersion medium, a water-absorbent polymer was used as the pore-forming material, hydroxypropyl methylcellulose was used as the organic binder, and fatty acid soap was used as the dispersant.

The green body was put into an extrusion molding machine and extruded through a die having a predetermined shape to obtain a cylindrical honeycomb formed body. The obtained honeycomb formed body was subject to dielectric-drying and hot-air drying, and then both end surfaces were cut so as to have predetermined dimensions to obtain a honeycomb dried body.

After plugging with cordierite as a material so that the first cells and the second cells are alternately arranged adjacent to each other, the obtained honeycomb dried body was degreased by heating at about 200° C. in the air atmosphere, and further fired at 1420° C. for 5 hours in the air atmosphere, thereby obtaining pillar-shaped honeycomb structure.

The specifications of the pillar-shaped honeycomb structure are as follows.

Overall shape: cylindrical shape with a diameter of 132 mm and a height of 120 mm
Cell shape in a cross-section perpendicular to the cell flow path direction: Square
Cell density (number of cells per unit cross-sectional area): 200 cpsi
Partition wall thickness: 8 mil (200 μm) (nominal value based on die specifications)

With respect to the pillar-shaped honeycomb structure produced above, using the particle attaching device having the configuration shown in FIG. 8, aerosol containing ceramic particles was ejected toward the central portion of the inlet side end surface of the pillar-shaped honeycomb structure in a direction perpendicular to the inlet side end surface, thereby attaching the ceramic particles to the surface of the first cells. The operating conditions of the particle attaching device are as follows.

Aerosol generator: RBG2000 manufactured by PALAS
Rotating body: Rotating brush
Ceramic particles accommodated in the container: SiC particles
  Median diameter (D50): 2.4 μm
  D10: 1.1 μm
  D90: 4.5 μm (Based on volume-based cumulative particle diameter distribution measured by laser diffraction/scattering method)
Weight of ejected ceramic particles: 6.0 g
Medium gas: Compressed dry air (dew point of 10° C. or less)
Ambient gas: Air
Average flow velocity of aerosol flowing into the pillar-shaped honeycomb structure: 3 m/s
Laser diffraction type particle diameter distribution measuring device: Insitec Spray manufactured by Malvern
Operating time: 20 seconds
Aerosol generator nozzle inner diameter: CD 8 mm
Distance from the nozzle tip of the aerosol generator to the inlet side end surface of the pillar-shaped honeycomb structure: 1000 mm
Aerosol ejection speed: 20 m/s While the particle attaching device was in operation, the volume-based particle diameter distribution of the ceramic particles ejected in the aerosol was measured by the laser diffraction type particle diameter distribution measuring device. The median diameter (D50) was 3.0 μm.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the method described above. The 3D shape measuring machine used for the measurement was VR-3200 manufactured by KEYENCE CORPORATION. The locations where the average thickness of the porous film was measured and the average thickness are summarized in Table 1-1. The direction in which first cell of the pillar-shaped honeycomb structure filter extend was defined as the extending direction of the coordinate axis, the coordinate value of the inlet side end surface was 0, and the coordinate value of the outlet side end surface was X.

TABLE 1-1

| Coordinate value | Average thickness of porous film (μm) | | |
|---|---|---|---|
| | 0.2X | 0.5X | 0.8X |
| Central portion | 18 | 26 | 28 |
| Outer peripheral portion | 10 | 20 | 30 |
| Overall | | 22.0 | |
| $(A_1 + A_2 + A_3)/(B_1 + B_2 + B_3)$ | | 1.20 | |

The porosity of the porous film and the partition wall of the pillar-shaped honeycomb structure filter obtained by the above manufacturing method was measured by the method described above. The devices used for measuring the porosity of the porous film were FE-SEM (model: ULTRA55 (manufactured by ZEISS)) and an image analysis software HALCON (Lynx Co., Ltd., version 11.0.5). A mercury intrusion porosimeter was used to measure the porosity of the partition wall. The results are shown in Table 1-2.

The "pressure loss" and "collection efficiency (%)" of the pillar-shaped honeycomb structure filter obtained by the above manufacturing method were measured.

[Pressure Loss]

Exhaust gas discharged from a 1.2 L direct injection gasoline engine was introduced at a flow rate of 600 m³/h at 700° C., and the pressure on the inlet side and the outlet side of the pillar-shaped honeycomb structure filter was measured. Then, the pressure loss (kPa) of the honeycomb filter was obtained by calculating the pressure difference between the inlet side and the outlet side. The results are shown in Table 1-2.

[Collection Efficiency (%)]

The pillar-shaped honeycomb structure filter was connected to the outlet side of an engine exhaust manifold of a 1.2 L direct injection gasoline engine vehicle, and the number of soot contained in the gas discharged from the outlet of the pillar-shaped honeycomb structure filter was measured by a PN measurement method. Regarding the driving mode, an especially severe driving mode was carried out in which the vehicle was accelerated to 60 km/hr within 10 seconds immediately after the start of the vehicle and then reduced the speed by 20 km/hr every 20 seconds. The cumulative number of soot discharged after running in the mode was taken as the number of soot of the exhaust gas purification device for evaluation, and the collection efficiency (%) was calculated from the number of soot. At this time, the flow velocity of the exhaust gas flowing into the pillar-shaped honeycomb structure filter was about 4 m/s. The results are shown in Table 1-2.

Further, porous film was formed with the same procedure as in Example 1 except that the shape of the pillar-shaped honeycomb structure filter was changed to an oval shape with a major axis of 231 mm×a minor axis of 106 mm×a height of 120 mm. When the pressure loss and the collection efficiency were measured, the same results as above were obtained.

TABLE 1-2

| Porous film porosity (%) | Pressure loss (KPa) | Collection efficiency (%) |
|---|---|---|
| 83 | 3.7 | 84.2 |
| Partition wall porosity (%) | | |
| 55 | | |

Example 2

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, aerosol containing ceramic particles was ejected toward the central portion of the inlet side end surface of the pillar-shaped honeycomb structure in a direction perpendicular to the inlet side end surface, thereby attaching the ceramic particles to the surface of the first cells, by using a particle attaching device having the same configuration as in Example 1 except that an aerosol generator having the structure shown in FIG. 9 using a Venturi ejector ISO 5011 dispersion nozzle (manufactured by PALAS) was used. The operating conditions of the particle attaching device are as follows.

Ceramic particles accommodated in the container: SiC particles
  Median diameter (D50): 2.4 µm
  D10: 1.1 µm
  D90: 4.5 µm
  (Based on volume-based cumulative particle diameter distribution measured by laser diffraction/scattering method)
Weight of ejected ceramic particles: 6.0 g
Medium gas: Compressed dry air (dew point of 10° C. or less)
Ambient gas: Air
Average flow velocity of aerosol flowing into the pillar-shaped honeycomb structure: 3 m/s
Laser diffraction type particle diameter distribution measuring device: Insitec Spray manufactured by Malvern
Operating time: 20 seconds
Aerosol generator nozzle inner diameter: CD 8 mm
Distance from the nozzle tip of the aerosol generator to the inlet side end surface of the pillar-shaped honeycomb structure: 1000 mm
Aerosol ejection speed: 20 m/s While the particle attaching device was in operation, the volume-based particle diameter distribution of the ceramic particles ejected in the aerosol was measured by the laser diffraction type particle diameter distribution measuring device. The median diameter (D50) was 2.8 µm.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 2-1.

TABLE 2-1

| | Average thickness of porous film (µm) | | |
|---|---|---|---|
| Coordinate value | 0.2X | 0.5X | 0.8X |
| Central portion | 9 | 23 | 29 |
| Outer peripheral portion | 11 | 20 | 26 |
| Overall | | 19.7 | |
| $(A_1 + A_2 + A_3)/(B_1 + B_2 + B_3)$ | | 1.07 | |

The porosity of the porous film and the partition walls of the pillar-shaped honeycomb structure filter obtained by the above manufacturing method was measured by the same method as in Example 1. The results are shown in Table 2-2.

The "pressure loss" and "collection efficiency (%)" of the pillar-shaped honeycomb structure filter obtained by the above manufacturing method were measured by the same method as in Example 1. The results are shown in Table 2-2.

TABLE 2-2

| Porous film porosity (%) | Pressure loss (KPa) | Collection efficiency (%) |
|---|---|---|
| 77 | 3.5 | 85.1 |

| Partition wall porosity (%) |
|---|
| 55 |

Example 3

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, using the particle attaching device having the same configuration as in Example 1, aerosol containing ceramic particles was ejected toward the central portion of the inlet side end surface of the pillar-shaped honeycomb structure in a direction perpendicular to the inlet side end surface, thereby attaching the ceramic particles to the surface of the first cells. The operating conditions of the particle attaching device are as follows.

Aerosol generator: RBG2000 manufactured by PALAS
Ceramic particles accommodated in the container: SiC particles
  Median diameter (D50): 2.4 μm
  D10: 1.1 μm
  D90: 4.5 μm
  (Based on volume-based cumulative particle diameter distribution measured by laser diffraction/scattering method)
Weight of ejected ceramic particles: 6.0 g
Medium gas: Compressed dry air (dew point of 10° C. or less)
Ambient gas: Air
Average flow velocity of aerosol flowing into the pillar-shaped honeycomb structure: 8 m/s
Laser diffraction type particle diameter distribution measuring device: Insitec Spray manufactured by Malvern
Operating time: 20 seconds
Aerosol generator nozzle inner diameter: CD 8 mm
Distance from the nozzle tip of the aerosol generator to the inlet side end surface of the pillar-shaped honeycomb structure: 1000 mm
Aerosol ejection speed: 40 m/s While the particle attaching device was in operation, the volume-based particle diameter distribution of the ceramic particles ejected in the aerosol was measured by the laser diffraction type particle diameter distribution measuring device. The median diameter (D50) was 3.1 μm.

The ceramic particles attached to the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 3-1.

TABLE 3-1

| | Average thickness of porous film (μm) | | |
|---|---|---|---|
| Coordinate value | 0.2X | 0.5X | 0.8X |
| Central portion | 12 | 20 | 29 |
| Outer peripheral portion | 7 | 17 | 21 |
| Overall | | 17.7 | |
| $(A_1 + A_2 + A_3)/(B_1 + B_2 + B_3)$ | | 1.36 | |

The porosity of the porous film and the partition walls of the pillar-shaped honeycomb structure filter obtained by the above manufacturing method was measured by the same method as in Example 1. The results are shown in Table 3-2.

The "pressure loss" and "collection efficiency (%)" of the pillar-shaped honeycomb structure filter obtained by the above manufacturing method were measured by the same method as in Example 1. The results are shown in Table 3-2.

TABLE 3-2

| Porous film porosity (%) | Pressure loss (KPa) | Collection efficiency (%) |
|---|---|---|
| 77 | 3.2 | 87.6 |

| Partition wall porosity (%) |
|---|
| 55 |

Example 4

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, aerosol containing ceramic particles was ejected toward the central portion of the inlet side end surface of the pillar-shaped honeycomb structure in a direction perpendicular to the inlet side end surface, thereby attaching the ceramic particles to the surface of the first cells, by using a particle attaching device having the same configuration as in Example 1 except that an aerosol generator having the structure shown in FIG. 9 was used. The operating conditions of the particle attaching device are as follows.

Aerosol generator: VRL50-080608 manufactured by PISCO
Ceramic particles accommodated in the container: SiC particles
  Median diameter (D50): 2.4 μm
  D10: 1.1 μm
  D90: 4.5 μm
  (Based on volume-based cumulative particle diameter distribution measured by laser diffraction/scattering method)
Weight of ejected ceramic particles: 6.0 g
Medium gas: Compressed dry air (dew point of 10° C. or less)

Ambient gas: Air

Average flow velocity of aerosol flowing into the pillar-shaped honeycomb structure: 8 m/s Laser diffraction type particle diameter distribution measuring device: Insitec Spray manufactured by Malvern Operating time: 20 seconds Aerosol generator nozzle inner diameter: Φ 8 mm Distance from the nozzle tip of the aerosol generator to the inlet side end surface of the pillar-shaped honeycomb structure: 1000 mm Aerosol ejection speed: 40 m/s While the particle attaching device was in operation, the volume-based particle diameter distribution of the ceramic particles ejected in the aerosol was measured by the laser diffraction type particle diameter distribution measuring device. The median diameter (D50) was 3.2 µm.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 4-1.

TABLE 4-1

| | Average thickness of porous film (µm) | | |
|---|---|---|---|
| Coordinate value | 0.2X | 0.5X | 0.8X |
| Central portion | 9 | 21 | 29 |
| Outer peripheral portion | 5 | 10 | 12 |
| Overall | | 14.3 | |
| $(A_1 + A_2 + A_3)/(B_1 + B_2 + B_3)$ | | 2.19 | |

The porosity of the porous film and the partition walls of the pillar-shaped honeycomb structure filter obtained by the above manufacturing method was measured by the same method as in Example 1. The results are shown in Table 4-2.

The "pressure loss" and "collection efficiency (%)" of the pillar-shaped honeycomb structure filter obtained by the above manufacturing method were measured by the same method as in Example 1. The results are shown in Table 4-2.

TABLE 4-2

| Porous film porosity (%) | Pressure loss (KPa) | Collection efficiency (%) |
|---|---|---|
| 74 | 3.1 | 90.4 |
| Partition wall porosity (%) | | |
| 55 | | |

Example 5

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, aerosol containing ceramic particles was ejected toward the central portion of the inlet side end surface of the pillar-shaped honeycomb structure in a direction perpendicular to the inlet side end surface, thereby attaching the ceramic particles to the surface of the first cells, by using a particle attaching device having the same configuration as in Example 1 except that an aerosol generator having the structure shown in FIG. 10 was used. The operating conditions of the particle attaching device are as follows.

Aerosol generator: BEG1000 manufactured by PALAS

Rotating body: Rotating Brush

Ceramic particles accommodated in the container: SiC particles

Median diameter (D50): 2.4 µm

D10: 1.1 µm

D90: 4.5 µm (Based on volume-based cumulative particle diameter distribution measured by laser diffraction/scattering method)

Weight of ejected ceramic particles: 6.0 g

First medium gas: Compressed dry air (dew point of 10° C. or less)

Second medium gas: Compressed dry air (dew point of 10° C. or less)

Ambient gas: Air

Average flow velocity of aerosol flowing into the pillar-shaped honeycomb structure: 6 m/s Laser diffraction type particle diameter distribution measuring device: Insitec Spray manufactured by Malvern Operating time: 20 seconds Aerosol generator nozzle inner diameter: Φ 8 mm Distance from the nozzle tip of the aerosol generator to the inlet side end surface of the pillar-shaped honeycomb structure: 1500 mm Aerosol ejection speed: 50 m/s While the particle attaching device was in operation, the volume-based particle diameter distribution of the ceramic particles ejected in the aerosol was measured by the laser diffraction type particle diameter distribution measuring device. The median diameter (D50) was 2.7 µm.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 5-1.

TABLE 5-1

| Coordinate value | Average thickness of porous film (μm) | | |
|---|---|---|---|
| | 0.2X | 0.5X | 0.8X |
| Central portion | 15 | 21 | 22 |
| Outer peripheral portion | 10 | 20 | 18 |
| Overall | | 17.7 | |
| $(A_1 + A_2 + A_3)/(B_1 + B_2 + B_3)$ | | 1.21 | |

The porosity of the porous film and the partition walls of the pillar-shaped honeycomb structure filter obtained by the above manufacturing method was measured by the same method as in Example 1. The results are shown in Table 5-2.

The "pressure loss" and "collection efficiency (%)" of the pillar-shaped honeycomb structure filter obtained by the above manufacturing method were measured by the same method as in Example 1. The results are shown in Table 5-2.

TABLE 5-2

| Porous film porosity (%) | Pressure loss (KPa) | Collection efficiency (%) |
|---|---|---|
| 71 | 3.4 | 85.2 |
| Partition wall porosity (%) | | |
| 55 | | |

Example 6

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, aerosol containing ceramic particles was ejected toward the central portion of the inlet side end surface of the pillar-shaped honeycomb structure in a direction perpendicular to the inlet side end surface, thereby attaching the ceramic particles to the surface of the first cells, by using a particle attaching device having the same configuration as in Example 1 except that an aerosol generator having the structure shown in FIG. 10 was used, and except for that. The operating conditions of the particle attaching device are as follows.

Aerosol generator: BEG1000 manufactured by PALAS
Rotating body: Rotating brush
Ceramic particles accommodated in the container: SiC particles
　Median diameter (D50): 2.4 μm
　D10: 1.1 μm
　D90: 4.5 μm
　(Based on volume-based cumulative particle diameter distribution measured by laser diffraction/scattering method)
Weight of ejected ceramic particles: 6.0 g
First medium gas: Compressed dry air (dew point of 10° C. or less)
Second medium gas: Compressed dry air (dew point of 10° C. or less)
Ambient gas: Air
Average flow velocity of aerosol flowing into the pillar-shaped honeycomb structure: 4 m/s
Laser diffraction type particle diameter distribution measuring device: Insitec Spray manufactured by Malvern
Operating time: 20 seconds
Aerosol generator nozzle inner diameter: CD 8 mm
Distance from the nozzle tip of the aerosol generator to the inlet side end surface of the pillar-shaped honeycomb structure: 1500 mm
Aerosol ejection speed: 40 m/s While the particle attaching device was in operation, the volume-based particle diameter distribution of the ceramic particles ejected in the aerosol was measured by the laser diffraction type particle diameter distribution measuring device. The median diameter (D50) was 2.6 μm.

The ceramic particles attached to the inlet side end surface of the pillar-shaped honeycomb structure thus obtained to which the ceramic particles were attached were sucked and removed by vacuum. After that, the pillar-shaped honeycomb structure is placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 6-1.

TABLE 6-1

| Coordinate value | Average thickness of porous film (μm) | | |
|---|---|---|---|
| | 0.2X | 0.5X | 0.8X |
| Central portion | 12 | 30 | 35 |
| Outer peripheral portion | 5 | 11 | 15 |
| Overall | | 18.0 | |
| $(A_1 + A_2 + A_3)/(B_1 + B_2 + B_3)$ | | 2.48 | |

The porosity of the porous film and the partition walls of the pillar-shaped honeycomb structure filter obtained by the above manufacturing method was measured by the same method as in Example 1. The results are shown in Table 6-2.

The "pressure loss" and "collection efficiency (%)" of the pillar-shaped honeycomb structure filter obtained by the above manufacturing method were measured by the same method as in Example 1. The results are shown in Table 6-2.

TABLE 6-2

| Porous film porosity (%) | Pressure loss (KPa) | Collection efficiency (%) |
|---|---|---|
| 75 | 3.1 | 86.8 |
| Partition wall porosity (%) | | |
| 55 | | |

Comparative Example 1

(1) Manufacture of Pillar-Shaped Honeycomb Structure Filter

A pillar-shaped honeycomb structure was obtained under the same manufacturing conditions as in Example 1.

The pillar-shaped honeycomb structure produced above was held by a holder so that the direction in which the cells extend was in the vertical direction, and a slurry containing SiC particles was flowed from above toward the inlet side end surface. At this time, the slurry was allowed to flow evenly over the entire inlet side end surface. The SiC particles contained in the slurry had a median diameter (D50) of 2.4 μm. The SiC particles in the slurry adhered to the surface of the first cells, while the water which had penetrated through the pillar-shaped honeycomb structure was discharged from the outlet side end surface. The outlet side end surface was connected to a drain pipe, and the discharged water was collected in a container. When the slurry was flowed through the pillar-shaped honeycomb structure, the air in the recovery container was sucked by a blower to apply a suction force to the outlet side end surface of the pillar-shaped honeycomb structure and promote the adhesion of the film material to the partition wall surface.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 7-1.

TABLE 7-1

| | Average thickness of porous film (μm) | | |
|---|---|---|---|
| Coordinate value | 0.2X | 0.5X | 0.8X |
| Central portion | 18 | 22 | 17 |
| Outer peripheral portion | 19 | 20 | 21 |
| Overall | | 19.5 | |
| $(A_1 + A_2 + A_3)/(B_1 + B_2 + B_3)$ | | 0.95 | |

The porosity of the porous film and the partition wall of the pillar-shaped honeycomb structure filter obtained by the above manufacturing method was measured by the same method as in Example 1. The results are shown in Table 7-2.

The "pressure loss" and "collection efficiency (%)" of the pillar-shaped honeycomb structure filter obtained by the above manufacturing method were measured by the same method as in Example 1. The results are shown in Table 7-2.

TABLE 7-2

| Porous film porosity (%) | Pressure loss (KPa) | Collection efficiency (%) |
|---|---|---|
| 72 | 3.9 | 84.1 |
| Partition wall porosity (%) | | |
| 55 | | |

Example 7

(1) Manufacture of Pillar-Shaped Honeycomb Structure Filter

A pillar-shaped honeycomb structure was obtained under the same manufacturing conditions as in Example 1.

With respect to the pillar-shaped honeycomb structure prepared above, aerosol containing ceramic particles was ejected toward the central portion of the inlet side end surface of the pillar-shaped honeycomb structure in a direction perpendicular to the inlet side end surface, thereby attaching the ceramic particles to the surface of the first cells, by using a particle attaching device having the same configuration as in Example 1 except that an aerosol generator having the structure shown in FIG. 9 was used. The operating conditions of the particle attaching device are as follows.

Aerosol generator: VRL50-080608 manufactured by PISCO

Ceramic particles accommodated in the container: SiC particles

Median diameter (D50): 2.4 μm

D10: 1.1 μm

D90: 4.5 μm (Based on volume-based cumulative particle diameter distribution measured by laser diffraction/scattering method)

Weight of ejected ceramic particles: 6.0 g

Medium gas: Compressed dry air (dew point of 10° C. or less)

Ambient gas: Air

Average flow velocity of aerosol flowing into the pillar-shaped honeycomb structure: 8 m/s Laser diffraction type particle diameter distribution measuring device: Insitec Spray manufactured by Malvern Operating time: 20 seconds Aerosol generator nozzle inner diameter: Φ 8 mm Distance from the nozzle tip of the aerosol generator to the inlet side end surface of the pillar-shaped honeycomb structure: 1000 mm Aerosol ejection speed: 20 m/s While the particle attaching device was in operation, the volume-based particle diameter distribution of the ceramic particles ejected in the aerosol was measured by the laser diffraction type particle diameter distribution measuring device. The median diameter (D50) was 2.4 μm.

The ceramic particles attached on the inlet side end surface of the pillar-shaped honeycomb structure thus obtained to which the ceramic particles were attached were sucked and removed by vacuum. After that, the pillar-shaped honeycomb structure was placed in an electric furnace and heat-treated in an air atmosphere under the conditions of keeping it at a maximum temperature of 1200° C. for 2 hours to form porous film on the surface of the first cells, thereby obtaining a pillar-shaped honeycomb structure filter. A necessary number of pillar-shaped honeycomb structure filters were prepared to carry out the following characteristic evaluation.

(2) Characteristic Evaluation

The average thickness of the porous film at predetermined positions of the pillar-shaped honeycomb structure filter obtained by the above manufacturing method was measured by the same method as in Example 1. The results are shown in Table 8-1.

TABLE 8-1

| Coordinate value | Average thickness of porous film (μm) | | |
|---|---|---|---|
| | 0.2X | 0.5X | 0.8X |
| Central portion | 13 | 17 | 27 |
| Outer peripheral portion | 4 | 12 | 17 |
| Overall | | 15.0 | |
| $(A_1 + A_2 + A_3)/(B_1 + B_2 + B_3)$ | | 1.73 | |

The porosity of the porous film and the partition walls of the pillar-shaped honeycomb structure filter obtained by the above manufacturing method was measured by the same method as in Example 1. The results are shown in Table 8-2.

The "pressure loss" and "collection efficiency (%)" of the pillar-shaped honeycomb structure filter obtained by the above manufacturing method were measured by the same method as in Example 1. The results are shown in Table 8-2.

TABLE 8-2

| Porous film porosity (%) | Pressure loss (KPa) | Collection efficiency (%) |
|---|---|---|
| 73 | 3.4 | 89.0 |
| Partition wall porosity (%) | | |
| 55 | | |

DESCRIPTION OF REFERENCE NUMERALS

100 Pillar-shaped honeycomb structure filter
102 Outer peripheral side wall
104 Inlet side end surface
106 Outlet side end surface
108 First cell
109 Plugged portion
110 Second cell
112 Partition wall
114 Porous film
120 Central portion
130 Outer peripheral portion
410 Aerosol generator
411 Nozzle
412 Ceramic particle
413 Flow path
413e Outlet
417 Medium gas flow path
417i Supply port
419 Accommodation unit
500 Particle attaching device
510 Aerosol generator
511 Nozzle
512 Ceramic particle
513 Cylinder
513e Cylinder outlet
514 Piston or screw
515 Loosening chamber
515e Loosening chamber outlet
516 Rotating body
517 Gas flow path
520 Laser diffraction type particle diameter distribution measuring device
530 Gas introduction pipe
531 Ventilation hole
540 Holder
550 Differential pressure gauge
560 Exhaust pipe
570 Blower
580 Pillar-shaped honeycomb structure
810 Aerosol generator
811 Nozzle
812 Ceramic particle
813 Second gas flow path
814 Belt feeder
815 Loosening chamber
815in Inlet
815e Loosening chamber outlet
816 Rotating body
817 First gas flow path
817e Outlet
818 Stirrer
819 Container
819e Discharge port
822 Ejector

The invention claimed is:

1. A pillar-shaped honeycomb structure filter comprising a plurality of first cells extending from an inlet side end surface to an outlet side end surface, each opening on the inlet side end surface and having a plugged portion on the outlet side end surface, and a plurality of second cells extending from the inlet side end surface to the outlet side end surface, each having a plugged portion on the inlet side end surface and opening on the outlet side end surface, the plurality of first cells and the plurality of second cells alternately arranged adjacent to each other with a porous partition wall interposed therebetween, wherein a porous film having a porosity higher than that of the partition wall is provided on a surface of each of the first cells, and assuming that a direction in which the first cells of the pillar-shaped honeycomb structure filter extend is an extending direction of a coordinate axis, a coordinate value of the inlet side end surface is 0, and a coordinate value of the outlet side end surface is X, the following relationship is satisfied:

$(A_1+A_2+A_3)/(B_1+B_2+B_3)>1.0$ wherein $B_1$ is an average thickness of the porous film in an outer peripheral portion, and $A_1$ is an average thickness of the porous film in a central portion, at a cross-section orthogonal to the direction in which the first cells of the pillar-shaped honeycomb structure filter extend at a coordinate value of 0.2X, $B_2$ is an average thickness of the porous film in the outer peripheral portion, and $A_2$ is an average thickness of the porous film in the central portion, at a cross-section orthogonal to the direction in which the first cells of the pillar-shaped honeycomb structure filter extend at a coordinate value 0.5X, and $B_3$ is an average thickness of the porous film in the outer peripheral portion, and $A_3$ is an average thickness of the porous film in the central portion, at a cross-section orthogonal to the direction in which the first cells of the pillar-shaped honeycomb structure filter extend at a coordinate value 0.8X.

2. The pillar-shaped honeycomb structure filter according to claim 1, wherein the following relationship is satisfied.

$(A_1+A_2+A_3)/(B_1+B_2+B_3) \geq 1.2$

3. The pillar-shaped honeycomb structure filter according to claim 1, wherein the following relationships (1) and (2)

are satisfied for the first cells located in the central portion of the cross-section orthogonal to the direction in which the first cells of the pillar-shaped honeycomb structure filter extend:
- (1) a ratio ($A_2/A_1$) of the average thickness $A_2$ of the porous film at the coordinate value 0.5X to the average thickness $A_1$ of the porous film at the coordinate value 0.2X is 1.05 to 5.0, and
- (2) a ratio ($A_3/A_1$) of the average thickness $A_3$ of the porous film at the coordinate value 0.8X to the average thickness $A_1$ of the porous film at the coordinate value 0.2X is 1.05 to 5.0.

4. The pillar-shaped honeycomb structure filter according to claim 1, wherein the following relationship is satisfied.

$$A_1 > B_1, A_2 > B_2, \text{ and } A_3 > B_3$$

5. The pillar-shaped honeycomb structure filter according to claim 1, wherein a main component of the porous film is silicon carbide, alumina, silica, cordierite or mullite.

6. The pillar-shaped honeycomb structure filter according to claim 1, wherein the porosity of the porous film is 70 to 85%.

7. The pillar-shaped honeycomb structure filter according to claim 1, wherein an average thickness of the entire porous film is 4 to 50 μm.

* * * * *